(12) United States Patent (10) Patent No.: US 7,117,051 B2
Landry et al. (45) Date of Patent: Oct. 3, 2006

(54) APPLIANCE COMMUNICATION SYSTEM AND METHOD

(75) Inventors: Kenneth D. Landry, Apex, NC (US); David I. Mansbery, Brecksville, OH (US); Diane E. Valachovic, Brecksville, OH (US)

(73) Assignee: TMIO, LLC, Brecksville, OH (US)

( * ) Notice: Subject to any disclaimer, the term of this patent is extended or adjusted under 35 U.S.C. 154(b) by 123 days.

(21) Appl. No.: 10/800,930

(22) Filed: Mar. 15, 2004

(65) Prior Publication Data

US 2005/0203647 A1    Sep. 15, 2005

(51) Int. Cl.
G05B 15/00 (2006.01)
(52) U.S. Cl. .......................... 700/83; 700/17; 700/65; 702/188; 709/218; 709/229; 710/18; 710/19; 340/3.1; 340/3.9; 340/5.2; 340/310.11
(58) Field of Classification Search .............. 700/9, 700/17, 19, 22, 65, 83, 286; 702/188; 709/217–219, 709/223–225, 229; 710/15–19, 36, 105–107; 340/3.1, 3.5, 3.9, 5.2, 5.81, 5.85, 310.01
See application file for complete search history.

(56) References Cited

U.S. PATENT DOCUMENTS

| | | | | |
|---|---|---|---|---|
| 4,442,319 | A * | 4/1984 | Treidl | 379/102.03 |
| 4,812,963 | A * | 3/1989 | Albrecht et al. | 700/2 |
| 5,711,606 | A * | 1/1998 | Koether | 374/149 |
| 6,059,195 | A * | 5/2000 | Adams et al. | 236/20 R |
| 6,121,593 | A * | 9/2000 | Mansbery et al. | 219/679 |
| 6,236,974 | B1 * | 5/2001 | Kolawa et al. | 705/7 |
| 6,479,792 | B1 * | 11/2002 | Beiermann et al. | 219/130.5 |
| 6,502,411 | B1 * | 1/2003 | Okamoto | 62/129 |
| 6,587,739 | B1 * | 7/2003 | Abrams et al. | 700/83 |
| 6,789,067 | B1 * | 9/2004 | Liebenow | 705/15 |
| 6,807,463 | B1 * | 10/2004 | Hamann et al. | 700/304 |
| 6,914,551 | B1 * | 7/2005 | Vidal | 341/176 |
| 6,957,111 | B1 * | 10/2005 | Zhu et al. | 700/90 |
| 2002/0073183 | A1 * | 6/2002 | Yoon et al. | |
| 2002/0093424 | A1 * | 7/2002 | Parry | |
| 2004/0010561 | A1 * | 1/2004 | Kim et al. | |
| 2004/0051625 | A1 * | 3/2004 | Nass et al. | |
| 2004/0111490 | A1 * | 6/2004 | Im et al. | |
| 2004/0267382 | A1 * | 12/2004 | Cunningham et al. | |
| 2005/0096753 | A1 * | 5/2005 | Arling et al. | |
| 2005/0159823 | A1 * | 7/2005 | Hayes et al. | |

FOREIGN PATENT DOCUMENTS

EP          1187021 A2 *  3/2002

* cited by examiner

*Primary Examiner*—Crystal J Barnes
(74) *Attorney, Agent, or Firm*—Tucker Ellis & West LLP

(57) ABSTRACT

A method for communicating with and controlling an intelligent appliance by a user from a remote device. The intelligent appliance includes an integrated controller, such as a single board computer, user-interface and integrated networking capabilities. Typically, the remote device is a personal data assistant, a tablet, a personal computer or a web-enabled cellular phone. The remote device establishes a connection with the intelligent appliance over a computer network, using wired or wireless connection techniques. The intelligent appliance verifies the identity of the user and provides the user with status updates. The remote device transmits a set of cooking instructions to the appliance. The intelligent appliance then cooks or refrigerates in accordance with the set of cooking instructions transmitted from the remote device and communicates this back to the remote device.

46 Claims, 19 Drawing Sheets

APPLIANCE COMMUNICATION SYSTEM AND METHOD

BACKGROUND OF THE INVENTION

The present invention relates generally to appliances, and more particularly to a method and system for communicating with an intelligent appliance.

Appliances, such as ovens and refrigerators, are capable of carrying out limited user defined instructions that are specified locally. Such instructions typically include start time, temperature, and duration. More remote user defined instructions are rarely, if ever, input into the appliance. A standard appliance, such as a refrigerator or oven, contains and uses the most basic of electrical control components, ranging from thermocouples, thermostats to cooling fans. The more complex appliances on occasion include limited microprocessor control systems. However, the control systems are not designed to carry out detailed instructions or allow control from a remote location.

Complex appliances are suitably capable of interaction and communication with other local appliances. However, such interaction is limited to those other appliances connected to the user's personal computer. Even the complex appliances lack the ability for direct communications, but rather use an exterior device of some sort, such as a computer, capable of interfacing with the appliance. The interfacing device is normally the user's personal computer, on which a software application provides the appliance with control and instruction. The personal computer also allows for the user to connect from a remote location via the Internet with his or her computer and instruct the computer to have the oven begin cooking at a set time, or pause cooking or cancel cooking. The intelligence, that is the communication controls, for the appliances are therefore not located on the appliance itself, but rather a personal computer functioning much like a server with each appliance being a networked client.

However, even in these advanced appliances, there is no ability to directly connect with the Internet for command or control purposes. Rather, the appliance makes use of either a local personal computer or some other means of connecting to the Internet. In essence, a server is required, ancillary to the appliance, which functions as a bridge between the Internet and the appliance. Such an appliance does not incorporate an intelligence module, capable of directly interfacing with the Internet. Thus the current appliances lack integrated means for connecting with a user outside a local area.

Thus there exists a need for a system that combines the capability of a classic residential or commercial appliance with the ability to directly interface with a user at a remote location. Furthermore, there exists the need for a method to access an intelligent appliance from a remote location.

SUMMARY OF THE INVENTION

In view of the aforementioned needs, the invention contemplates a system and method for communicating with an intelligent residential or commercial appliance.

In accordance with the present invention, there is provided a system for communicating with an intelligent appliance. The intelligent appliance suitably comprises an integrated controller for directing operations of the appliance, monitoring the appliance and controlling the appliance from outside the appliance. In one embodiment the integrated controller is a suitable single board computer capable of interfacing with a computer network. The appliance further comprises a user-interface, enabling a user to program the appliance. The system also comprises means for communicating with the Internet, which enables the appliance to communicate with external devices via the Internet. Various devices are suited to communicate with the appliance, including telephones, personal data assistants, remote computers and the like, using the integrated controller over the Internet, directly with the controller via wireless connectivity, or via any suitable means.

Further in accordance with the present invention, there is provided an intelligent appliance control system. The system comprises a data transport adapted to place an associated appliance in data communication with an associated remote user interface. The system includes means adapted for acquiring state information from the associated appliance. The state information represents at least one current or future state of the associated appliance. The system also includes means adapted for communicating the state information to the data interface. The state information is thereby made available for communication to the associated remote user interface. The data transport interface includes means for acquiring state change information received from the associated, non built-in user interface. The state change information represents an altered, desired state of the associated appliance. The system comprises means adapted for generating a state change signal representing the desired state of the associated appliance. The system further comprises means adapted for communicating the state change signal to the associated appliance.

Still further in accordance with the present invention, there is provided a method for controlling an intelligent appliance from a remote device. The remote device and the appliance establish a connection over a suitable network. In the attempt to establish a connection, the remote device sends authentication information, identifying the user to the appliance. Once verified, the remote device transmits a message to the appliance. The appliance receives the message and operates according to a set of instructions contained within the message. The appliance is suitably equipped to provide updates on the status of cooking, cleaning, problems or the like. In another embodiment the appliance generates remote notifications or receives and understands voice commands.

In one embodiment, the intelligent appliance comprises an integrated, single board computer, directing the operations of a user-interface, an electronic range control, and communications with external devices. The integrated, single board computer is suitably capable of performing range control functions without the need of a specific range control.

In another embodiment, the intelligent appliance communicates with external devices via the Internet. In one aspect, the Internet is used to connect external devices to a remote server, the server providing access to the intelligent appliance.

Still yet further in accordance with the present invention, there is provided an electronic messaging system for communicating between a residential or commercial appliance and a remote device. The system comprises means adapted for generating an electronic message to an appliance and means adapted for generating an electronic message to the remote user. The system further includes means adapted for editing the electronic message including allowing for the identification of a destination address. Means adapted for connecting a remote device with the appliance are also incorporated into the present system, as well as means adapted for transmitting information between the remote device and the appliance.

In one embodiment, the system also comprises authenticating means adapted for verifying the identity of the remote device. The system is suitably equipped with means adapted for interpreting voice signals.

Yet further in accordance with the present invention, there is provided a method for controlling an intelligent appliance. The method includes the step of acquiring state information from an associated appliance. The state information represents at least one current or future state of the associated appliance. The method also includes the step of communicating the state information to a data interface. The data interface is in communication with an associated remote user interface, enabling the state information to be made available for communication to the associated remote user interface. The method further includes the step of acquiring state change information from the associated, non built-in user interface by the data interface. The state change information represents an altered, desired state of the associated appliance. The method also comprises the step of generating a state change signal representing the desired state of the associated appliance. The method also comprises the step of communicating the state change signal to the associated appliance.

In one embodiment, the appliance is programmed to list all dishes stored in memory, create a new dish, modify an existing dish or delete a stored dish. Requests are formed by the remote device and dish information is collected. The dish information, along with commands, are transmitted to the appliance, thereafter listing, adding, modifying or deleting dishes.

In another embodiment, the remote device prompts a user for the Internet protocol address and port information of a selected appliance. Still another embodiment provides cooking instructions transmitted as the electronic message.

These and other advantages, aspects, and features will be understood by one of ordinary skill in the art upon reading and understanding the specification.

BRIEF DESCRIPTION OF THE DRAWINGS

It will be appreciated that the illustrated boundaries of elements (e.g. boxes, groups of boxes, or other shapes) in the figures represent one example of the boundaries. One of ordinary skill in the art will appreciate that one element is suitably designed as multiple elements or that multiple elements are suitably designed as one element. An element shown as an internal component of another element is suitably implemented as an external component and vice versa.

DETAILED DESCRIPTION OF PREFERRED AND ALTERNATE EMBODIMENTS

Figure 1:
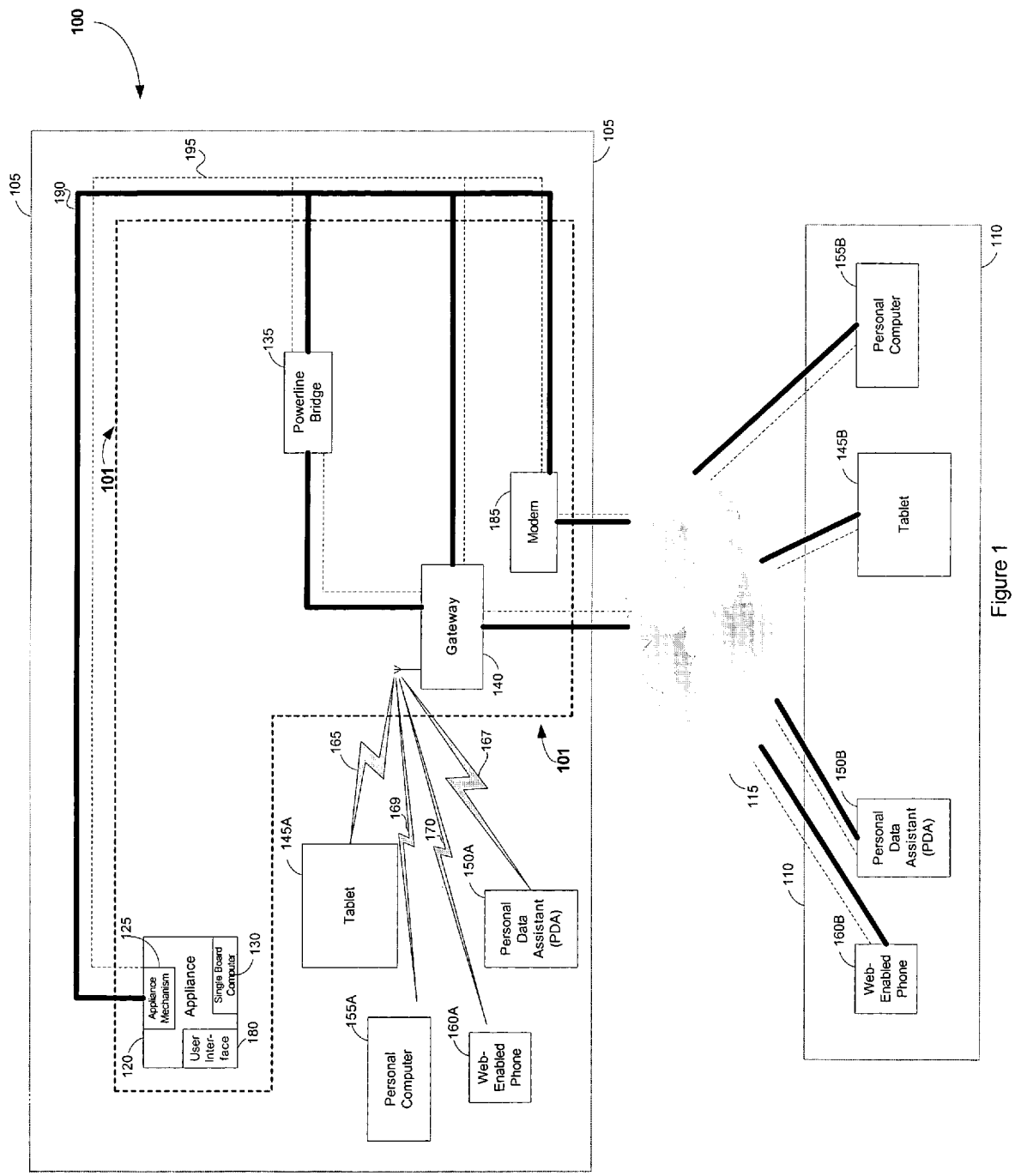
FIG. 1 is a system diagram of one embodiment of an intelligent appliance system and method;.

Throughout this description, the preferred embodiment and examples shown should be considered as exemplars, rather than limitations, of the present invention. Briefly describing one embodiment of the present system and method, it provides a mechanism for a remote user to directly communicate with and control an intelligent residential or commercial appliance. It will be understood by those skilled in the art that the term remote, as used with reference the subject invention, is suitably interpreted to mean non-integrated to the appliance, i.e., not built-into the appliance. In other words, the system provides for an intelligent residential or commercial appliance, preferably a refrigerator-oven, having built-in network communications which is suitably delivered as wireless, power-line or direct network cabling. It will be appreciated that the envisioned intelligent appliance enables a user, through the method provided herein, to remotely use the intelligent appliance directly, without the necessity of using a proprietary network control system or personal computer acting in the capacity of a server. The skilled artisan will appreciate that direct communications between a user and the intelligent appliance do not require the use of a proprietary network control system or personal computer, however the subject invention is suited to communicate with a personal computer or proprietary network control system without detracting from the benefits discussed hereinafter. Furthermore, the skilled artisan will appreciate that a communication state of the intelligent appliance includes information relating to past data of the intelligent appliance, such as a loss of power, time spent heating, average temperature and the like. In one embodiment, the present invention comprises an intelligent appliance, capable of communication directly with a remote device via any known form of electronic communications, including, but not limited to, infra-red, radio frequency, wireless or wired network communications protocols and the like.

As will be understood by those skilled in the art, the intelligent appliance system and method contemplated by the present invention is suitably adapted for use in both the residential and commercial environments. The skilled artisan will appreciate that both residential and commercial users are capable of utilizing the communications methods described herein.

It will be appreciated that the system described herein is suitably used in conjunction with any wired or wireless network configuration. For example, alternate embodiments include use of networks configured using Wi-Fi (e.g., IEEE 802.x), infra-red, optical, radio frequency (RF), Powerline, Bluetooth technology and like. Furthermore, while the detailed embodiment describes the application to an oven or other food preparation appliance, one skilled in the art will appreciate the application of the method and system described herein to other residential and commercial appliances, such as dishwashers, clothes washing machine, clothes dryer, and the like.

Illustrated in FIG. 1 is a simplified component diagram of one embodiment of an intelligent appliance communication system 100. As illustrated in FIG. 1, the system 100 generally includes an appliance side 105 and a remote or client side 110 of the system 100 connected via a network 115. It will be understood by those skilled in the art that the network is any suitable network for electronic devices to communicate with each other as known in the art. For example, Ethernet, Token Ring, 802.x, Powerline, Bluetooth, infra-red, optical, radio frequency, or other standard is suitably adapted for use with the subject invention. It will be appreciated that the components described in the following embodiments of the system is suitably embodied within a computer, an appliance, a separate client, or a combination of these.

In an embodiment, the appliance side 105 of the system 100 includes an intelligent appliance 120 having an appliance mechanism 125 suitably configured to perform a utility function (e.g., bake, refrigerate, refrigerate, wash, dry), a user-interface 180 providing display and programming options to a user, and an integrated controller, shown in FIG. 1 as an embedded single board computer 130, configured to communicate with and process instructions received from the client side 110 of the system 100. In an alternate embodiment of the subject invention a controller, which has the ability to perform the appliance mechanism 125 functions of the intelligent appliance 120 is associated with, but not integrated into the intelligent appliance 120. The user-interface 180 includes, but need not be limited to a liquid crystal display (LCD) with or without touch-screen capabilities. The user-interface 180 is controlled by the embedded single board computer 130, and enables a user to view the program cooking instructions, set temperatures and the like.

Providing connection between the gateway 140 and the intelligent appliance 120 are a physical layer 190 and a data transport layer 195. The skilled artisan will appreciate that the physical layer 190 is any suitable means for connecting the intelligent appliance 120 to the gateway 140 or, alternatively to the modem 185, such as wireless, wired, power-line, CAT5, or other physical connection media. The skilled artisan will further appreciate that the data transport layer 195 is any suitable transport protocol capable of transporting datagrams between electronic devices, such as hyper-text transfer protocol, file transport protocol, real time transport protocol, or other suitable data transport protocol.

The embedded single board computer 130, includes means for communicating with the client side 110 of the system 100. For example, an integrated Ethernet, 10/100/1000 network interface card, wireless network interface card, a power-line interface card or the like, is suitably used to facilitate the connection to and communication over the network 115. Alternatively, the intelligent appliance 120 suitably uses other means for communicating with the client side 110. For example, the appliance side 105, as shown in FIG. 1, includes a power-line bridge 135 and a gateway 140 configured to facilitate connection to the network 115.

To receive electronic messages, such as food preparation instructions from the client side 110, the intelligent appliance 120 has an assigned network address identifying the intelligent appliance 120 on the network 115 to which other devices on the client side 110 transmits messages. For example, sending devices, such as a tablet 145B, a personal data assistant (PDA) 150B, a web-enabled cellular phone 160B, and a personal computer 155B are illustrated. It will be appreciated by those skilled in the art that, when taking into consideration the method contained herein, the web-enabled cellular phone 160B is suitably a typical cellular telephone when combined with voice recognition software. Messages received by the intelligent appliance 120, and more specifically, the embedded single board computer 130, are screened to determine if a received message originated from an authorized sender. While the following example uses the electronic devices named above, those skilled in the art will appreciate that the present invention need not be limited to those items. Other personal electronic devices are suitably developed capable of accessing the Internet, communicating with other electronic devices or the like. Such personal electronic devices, it will be understood by those skilled in the art, are applicable to the subject invention.

It will be appreciated that the intelligent appliance 120 is suitably viewed and controlled either locally 105 or across the network 115. For example, it will be appreciated that a tablet 145A, a PDA 150A, a personal computer such as a laptop 155A, or a web-enabled cellular phone 160A, are suitably configured to wirelessly communicate with the intelligent appliance 120 through the appliance side 105 gateway 140 via communications channels 165, 167, 169 and 170, respectively. As further shown in FIG. 1, the tablet 145B or the PDA 150B or web-enabled cellular phone 160B, or personal computer 155B are suitably configured to communicate with the intelligent appliance 120 through the remote side 110 via any suitable means to connect to the Internet 115 and thereby send and receive information from the intelligent appliance 120.

In one embodiment, the ability for the intelligent appliance 120 to communicate with a personal computers 155A, 155B, web-enabled cellular phones 160A, 160B, PDAs 150A, 150B and tablets 145A, 145B, is facilitated by the different types of connections known in the art. For example, the intelligent appliance 120 is capable of integration into a structure that was constructed without pre-installed Ethernet wiring, using suitable alternate physical communication technologies, such as wireless 190 or powerline 135 in order to facilitate the connection. For this reason, the intelligent appliance 120 is suitably equipped with either wireless or power-line communication, or a combination of both forms, as is shown in FIG. 1 with reference to the physical transport layer 190. In an alternate embodiment, the appliance side 105 communicates with the remote client side 110 via a modem 185. It will be appreciated by those skilled in the art that the use of a modem enables the intelligent appliance to dial-up to the Internet 115 without the need for the gateway 140.

By using these technologies, intelligent appliance 120 easily connects into any local network. In addition, with the predominance of broadband internet connections (DSL, Cable, ISDN, etc.) in residential and commercial facilites, access to appliances from a remote location is straightforward.

In one embodiment, the intelligent appliance 120 uses an extensible markup language (XML) communication protocol to transmit status data and operation instructions between the appliance side 105 and client side 110 of the system 100. It will be appreciated that the XML dialect is suitably transmitted over a variety of connections available. For example, the XML dialect is suitably transmitted using connections such as wireless and power-line technologies, as well as standard wire-line (e.g. directly connected Ethernet) technology and the like. While utilizing XML in this embodiment, one skilled in the art will appreciate that other communications languages are suitably used, including, but not limited to hypertext markup language (HTML), standard generalized markup language (SGML), Java, Python, JavaScript, ActiveX, or other web-based communications or programming languages.

In accordance with the present system, an intelligent appliance 120 suitably communicates with sending devices 145A, 145B, 150A, 150B, 155A, 155B, 160A, 160B and users in a variety of ways. It will be appreciated that an intelligent appliance 120 and specifically, the embedded single board computer 130, in accordance with the present system is suitably configured to use an open XML standard for communication. For example in a preferred embodiment, the present system uses Tonight's Menu Extensible Markup Language (TMXML), as an open XML standard. Therefore, software to view and control the operations of the appliance mechanism 125 is suitably easily crafted by one skilled in the art.

Alternatively, an appliance mechanism 125 in accordance with the present system is suitably controlled through another XML protocol called voice extensible markup language (VXML). It will be understood that this voice protocol is suitably the standard language used by voice portals or systems. Further, it will be understood that by supporting VXML, Interactive Voice Recognition (IVR) systems are suitably constructed to enable users to obtain status and control the intelligent appliance 120 from standard voice recognition devices (e.g. digital and cellular telephones).

In accordance with an embodiment, the software for viewing and controlling the operations and status of the appliance mechanism 125 is contemplated to come in a variety of configurations for managing appliances 120. For example, the software is suitably available for Windows systems, PDAs (PocketPC and Palm OS), Linux, internet browsers, and other operating systems. Accordingly, the software suitably resides on the single board computer 130 of the intelligent appliance 120. In an alternate embodiment, the software is suitably located on the personal computer 155A, 155B, the PDA 150A, 150B, the tablet 145A, 145B, or the web-enabled cellular phone 160A, 160B, and the intelligent appliance 120, which then suitably control the intelligent appliance 120 or view status information about the intelligent appliance 120. It will be appreciated that with the proper configuration, users can securely access intelligent appliances 120 from any location. Security features include an authentication challenge for accessing the intelligent appliance 120 as well as encryption of the protocol during transmission to and from the intelligent appliance 120.

In an alternate embodiment of the subject invention, the intelligent appliance 120 comprises the components of FIG. 1 enclosed in block 101. As shown, the intelligent appliance includes the gateway 140, the power-line bridge 135, the modem 185, as well as the appliance mechanism 125 and the user interface 180. It will be appreciated by those skilled in the art that such an embodiment is suitably incorporated into older buildings, lacking pre-equipped Ethernet or network capabilities.

Figure 2:
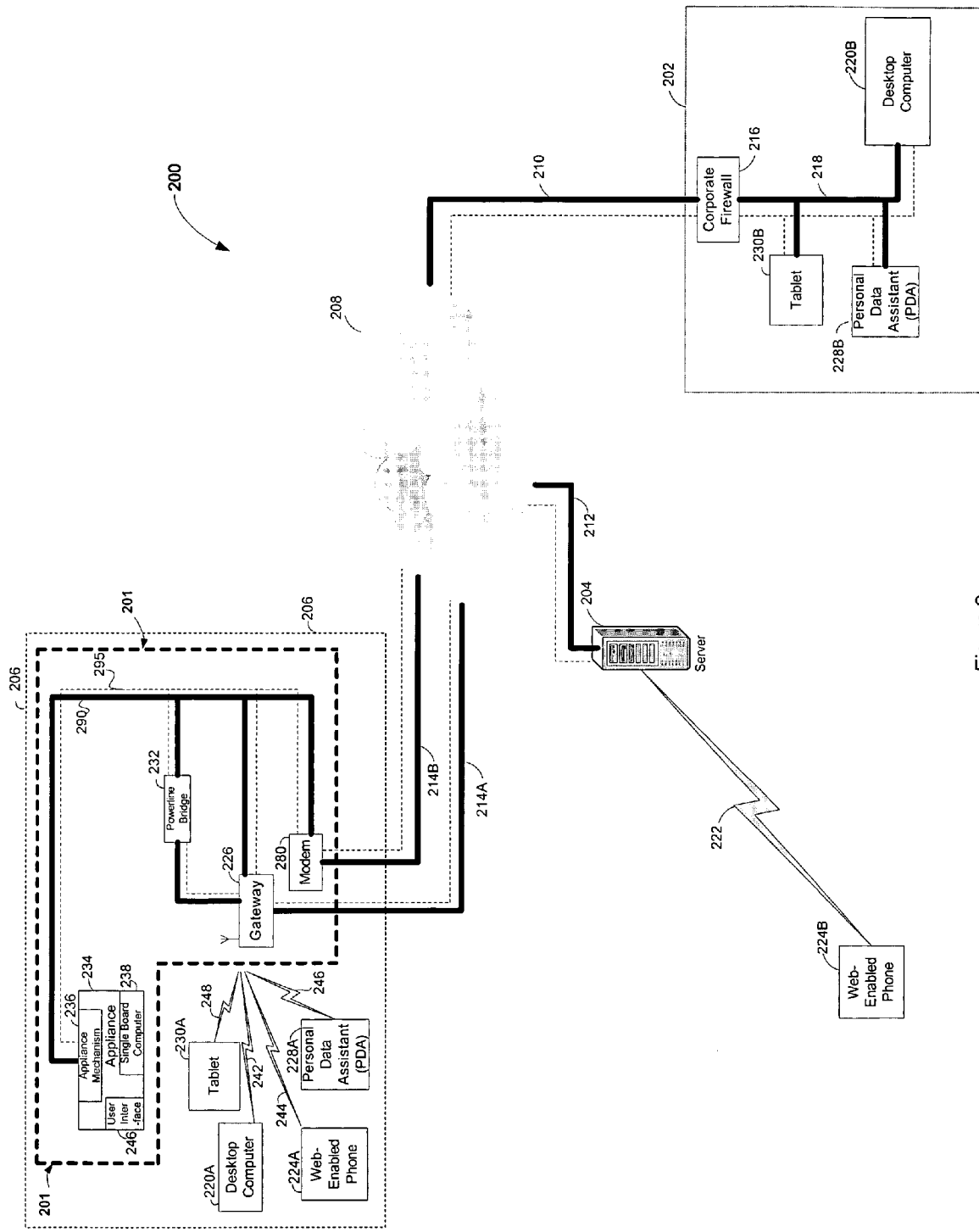
FIG. 2 is a system diagram of an alternate embodiment of an intelligent appliance system and method.

Referring now to FIG. 2, there is shown an alternate embodiment of the intelligent appliance system of the subject invention. As shown in FIG. 2, there is a system 200 comprising a local side 206, a remote Internet connected side, shown in FIG. 2 as an office 202, and a web-enabled cellular phone 224B. The office side 202 includes an office network 218, to which a user's personal computer 220B, PDA 228B and tablet 230B are connected. It will be appreciated by the skilled artisan that the user is able to suitably take the PDA 228A or the PDA 228B and exchange the relative positions without affecting the operation of the invention. For example, the user takes his or her PDA 228A from the local side 206 to the office 202. The same exchange is suitably performed with a web-enabled cellular phone 224A, 224B, tablet PC 230A, 230B, or personal computer 220A, 220B, e.g., a laptop computer. The user then, using a suitably adapted connection (i.e., Bluetooth, 802.x wired, etc.), accesses the local side 206 using the transported PDA 228A from the office side 202. It will further be appreciated by those skilled in the art that the term local, as used with reference herein, is suitably used to identify a residential or commercial structure housing the intelligent appliance 234.

It will be understood by those skilled in the art that the corporate firewall 216, which acts to protect the office network 218 from unwanted intrusions from outside systems, such as over the connection 210 to the Internet 208, enables the personal computer 220B to access the Internet 208 without being subjected to unwanted access by other users outside the office network 218. Located at a site remote from the office side 202, the local side 206 and the web-enabled cellular phone 224B are one or more servers 204, in communication with the local side 206, the office side 202 and web-enabled cellular phone 224B via the Internet 208 over the server's connection 212. To enable the communication between the web-enabled cellular phone 224B and the server 204, communications signal 222 runs over a public switched cellular telephone network.

While the system 200 uses a broadband Internet connection 214A for connection of the local side 206 to the Internet 208, it will be appreciated by those skilled in the art that a slower, public switched telephone network Internet connection 214B, operatively connected to modem 280, will also enable data transfer between the local side 206 and the Internet 208. As is well-known in the art, data transfer over the public switched telephone network, known commonly as "dial-up", is typically slower than broadband. Thus, the local side 206 is suitably equipped with broadband Internet access 214A using a gateway 226.

As shown in FIG. 2, the office network 218, the office connection 210, the server connection 212, and the local side connections 214A, 214B suitably comprise a physical layer 290 and a data transport protocol 295. As will be understood by those skilled in the art, the physical layer 290 is any suitable means for connecting the intelligent appliance 234 to the gateway 226 or to the modem 280, such as wireless, wired, power-line, CAT5, or other physical connection media. The skilled artisan will further appreciate that the data transport layer 295 is any suitable transport protocol capable of transporting datagrams between electronic devices, such as hyper-text transfer protocol, file transport protocol, real time transport protocol, or other suitable data transport protocol.

It will be understood that the gateway 226 performs many network functions such as routing, firewall protection and Dynamic Host Control Protocol server. The Dynamic Host Control Protocol, or DHCP, server functions to automatically configure computers and other devices which use TCP/IP. While inbound information from the Internet 208 over broadband connection 214A is somewhat restricted by the firewall function of the gateway 226, outbound initiated communication is generally allowed which enables a user, a computer, or other device within the local side 206 to access the Internet 208 easily. Such access is suited to occur through, but need not be limited to, communications using Network Address Translation.

The local side 206 further includes an intelligent appliance 234 comprising an appliance mechanism 236, an embedded single board computer 238, a user-interface 246, and means for connecting to a network. The embedded single board computer 238 communicates with the appliance mechanism 236. In an alternate embodiment, the single board computer 238 is suitably associated with, but not integrated into, the intelligent appliance 234. In another embodiment it will be understood that the single board computer 238 suitably performs the appliance mechanism 236 functions of the intelligent appliance 234. In still another embodiment, the single board computer 238 is suitably configured to comprise communications components, known in the art, to communicate with a remote client via the Internet 208. The single board computer suitably comprises an integrated network interface card to access the local network using a standard connection. The skilled artisan will appreciate that the standard Ethernet connection jack, the RJ45, is suitably used in those networks which are Ethernet based, however, the subject application need not be limited solely to using Ethernet networking, but is readily adaptable to other networking configurations. The user-interface 246 is suited to comprise, but need not be limited to a liquid crystal display (LCD) with or without touch-screen capabilities.

In an alternate embodiment of the subject invention, the intelligent appliance 234 comprises the components of FIG. 2 enclosed in block 201. As shown, the intelligent appliance includes the gateway 226, the power-line bridge 232, the modem 280, as well as the appliance mechanism 236 and the user interface 246. It will be appreciated by those skilled in the art that such an embodiment is suitably incorporated into older buildings, lacking pre-equipped Ethernet or network capabilities. It will also be appreciated by those skilled in the art that the single board computer 238 of the intelligent appliance 234 is suitably adapted to functioning as a server for other appliances.

In the preferred embodiment, the appliance mechanism 236 of the intelligent appliance 234 heats and cools food items. The embedded single board computer 238 further communicates with the appliance mechanism 236, thus, the embedded single board computer 238 is able to place the oven in cooking cycles, refrigerate, perform self-cleaning and also retrieve sensor information from the appliance mechanism 236.

The intelligent appliance 234 is suitably configured to use DHCP to retrieve a dynamic IP address or can be setup with a static IP address. This is configurable on the user-interface 246. The intelligent appliance 234 is suitably connected directly to the gateway 226 via the physical layer 290 within the residential or commercial structure. In an alternate embodiment, the intelligent appliance is bridged via power-line 232 or wirelessly to the gateway 226.

As discussed with respect to FIG. 1, control of the intelligent appliance 234 at the local side 206 is suitably accomplished by devices within the local environment, such as a personal computer 220A (i.e. laptop), a web-enabled cellular phone 224A, a PDA 228A, or a tablet computer 230A, or other electronic device. The personal computer 220A, the web-enabled cellular phone 224A, the PDA 228A and/or the tablet computer 230A, communicate(s) with the intelligent appliance 234 through the gateway 226 via communications channels 242, 244, 246 and 248, respectively, or directly with the intelligent appliance 234 via the single board computer 238. The skilled artisan will appreciate that the local side 206 of FIG. 2 and the appliance side 105 of FIG. 1 function in much the same manner and need not be readdressed herein. However, the use of additional components of the system 200 will now be discussed.

In this alternate embodiment, the intelligent appliance 234 will proactively establish outbound internet connections to one or more servers 204. The server 204 is suitably physically located at the appliance 234 manufacturer's facilities or securely residing at designated Co-Location facilities. The purpose of this is to allow communication to the intelligent appliance 234 by first establishing an outbound connection 214A or 214B from the local side 206. The one or more servers 204 act as an authentication mechanism and a conduit that will allow a user to easily communicate with the intelligent appliance 234 via the Internet 208 over the server connection 212.

The one or more servers 204 accept the connection from the local side 206 and authenticate the intelligent appliance 234 as a valid appliance. It will be appreciated that such communications are suited to include, but need not be limited to Hyper Text Transfer Protocol (HTTP) and XML payloads to authenticate and validate the intelligent appliance 234. Upon validation of the intelligent appliance 234, the connection will remain established, but inactive until such time as either the intelligent appliance 234 or the server 204 terminate the connection, or go active when the user is ready to communicate with the intelligent appliance.

Once the intelligent appliance 234 is in communication with the server 204, a user communicates directly with the intelligent appliance 234 through the server 204. The communication between the user and the intelligent appliance 234 via the server 204 is suitably accomplished through several different methods. For example, a user at his or her office 202 runs a web browser on the personal computer 220B and access the server 204 via the Internet 208. The user-interface 246 of the intelligent appliance 234 is then displayed on the browser at the personal computer 220B. The web application then prompts the user to authenticate himself or herself. Upon authentication, the server 204 will establish a data communication channel with the user at the office side 202 and pair up the user with his or her intelligent appliance 234. All communication between the user and the intelligent appliance 234 passes through the server 204 using Internet connections 210, 212 and 214A or 214B. In this embodiment, the server 204 acts as a conduit delivering data back and forth between the intelligent appliance 234 and the user at the personal computer 220B. One skilled in the art will recognize that the sending devices such as tablet 230B or a personal data assistant 228B are suitably used in the place of the personal computer 220B.

It will be understood by those skilled in the art that the preceding example also is accomplished using the web-enabled cellular phone 224B in place of the personal computer 220B. In this alternate embodiment, the server 204 is suitably equipped with telephony equipment to accept inbound voice communications via connection 222. An IVR system provides the user with the capability to manage the intelligent appliance 234 from the web-enabled cellular phone 224B. Such management typically will require the user to first authenticate himself or herself. Phone number detection and Automated Speech Recognition (ASR) will assist the user in the authentication process. Once authenticated, the IVR session with the user will be linked to the intelligent appliance 234 via connection 222 from the phone 224B to the server 204 and connections 212 and 214A or 214B, from the server 204 to the Internet 208 to the local side 206.

The operation of the present system and various components will be better understood by referencing FIG. 3 through FIG. 17. The illustrated elements in the Figures denote steps and represent instructions or groups of instructions that cause a processor, mechanism, or other device to perform a function, an action, and/or to make a decision.

Alternatively, the steps represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications involve dynamic and flexible processes such that the illustrated steps can be performed in other sequences different than the one shown and/or steps are suitably combined or separated into multiple components.

With reference to FIGS. 3 through 17, the methodology will be described with reference to an intelligent refrigerator/oven having a built-in bi-directional Internet communications system. Although, the embodiments of the present system will be described in connection with an intelligent refrigerator/oven having a built-in bi-directional Internet communications system, it will be appreciated that the methodology described herein is suitably applicable to other appliances and apparatus without departing from the scope of the invention. For example, the system described herein is suitably applicable to household or commercial clothes washing machines, clothes drying machines, dish washing machines, security systems, automobiles, health care equipment and instrumentation, manufacturing machinery and the like.

Figure 3:
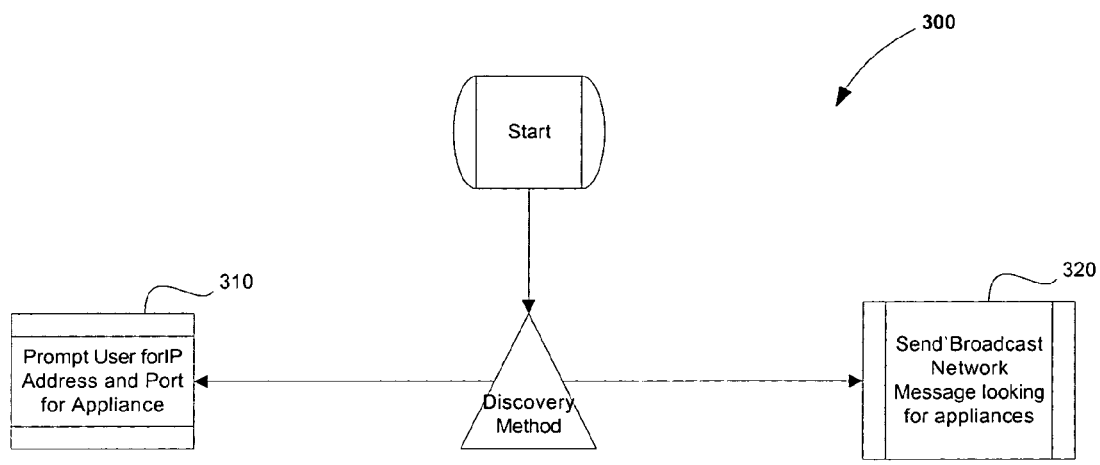
FIG. 3 illustrates one embodiment of a methodology for the appliance discovery process in accordance with the present system and method.

Illustrated in FIG. 3 is one embodiment of a methodology 300 associated with the appliance discovery process. Upon power up, the intelligent appliance 120 initializes its communications subsystem. Concurrently, the client side of the subsystem is suitably configured to perform two routines. Specifically at step 310, the remote or client side of the system prompts users for IP address and port identification information for a specific appliance. Additionally, the remote or client side of the system sends a broadcast network message seeking a network connected appliance 320.

Figure 4:
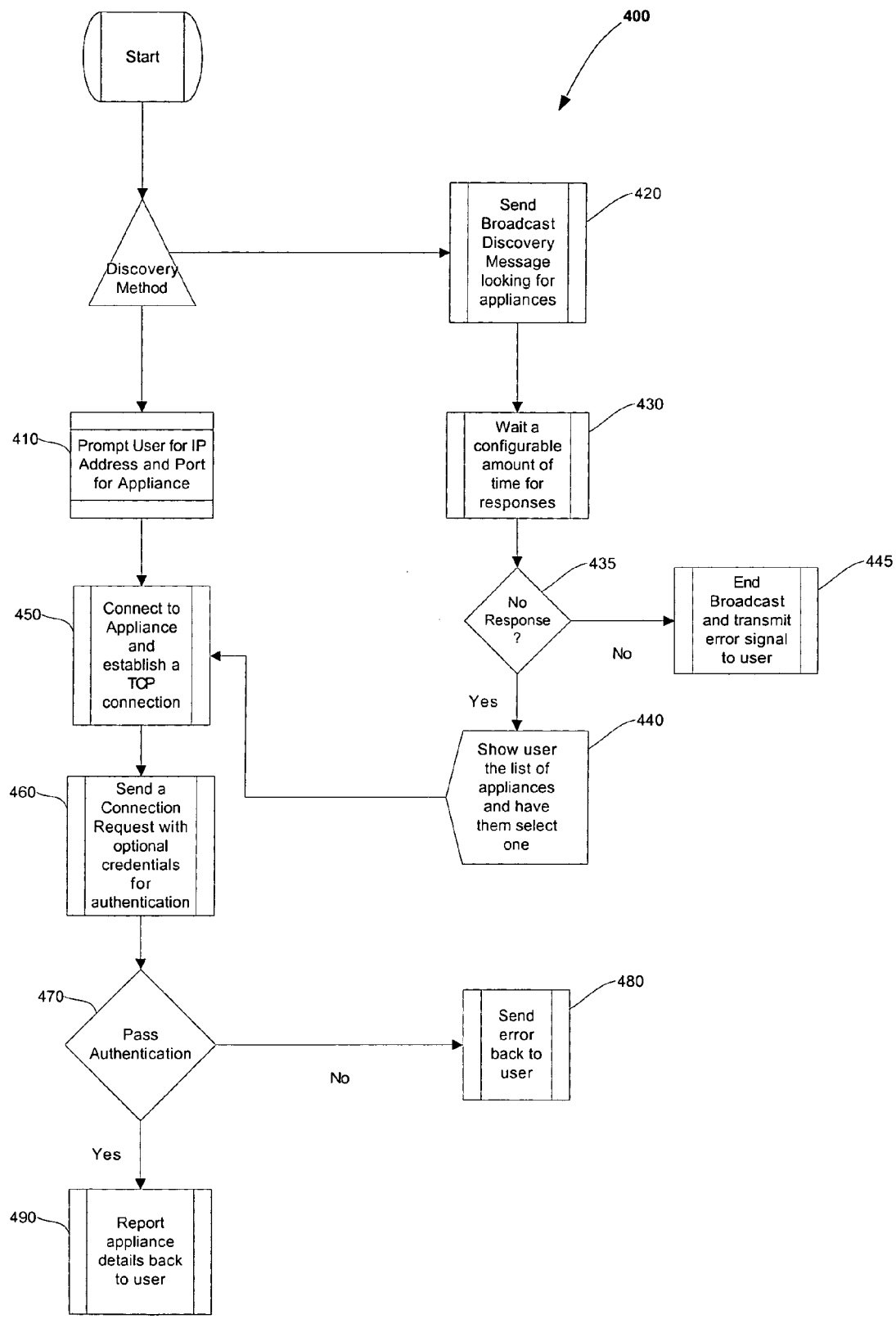
FIG. 4 illustrates one embodiment of a methodology for the remote or client side of the appliance discovery procedure in accordance with the present system and method.
Figure 5:
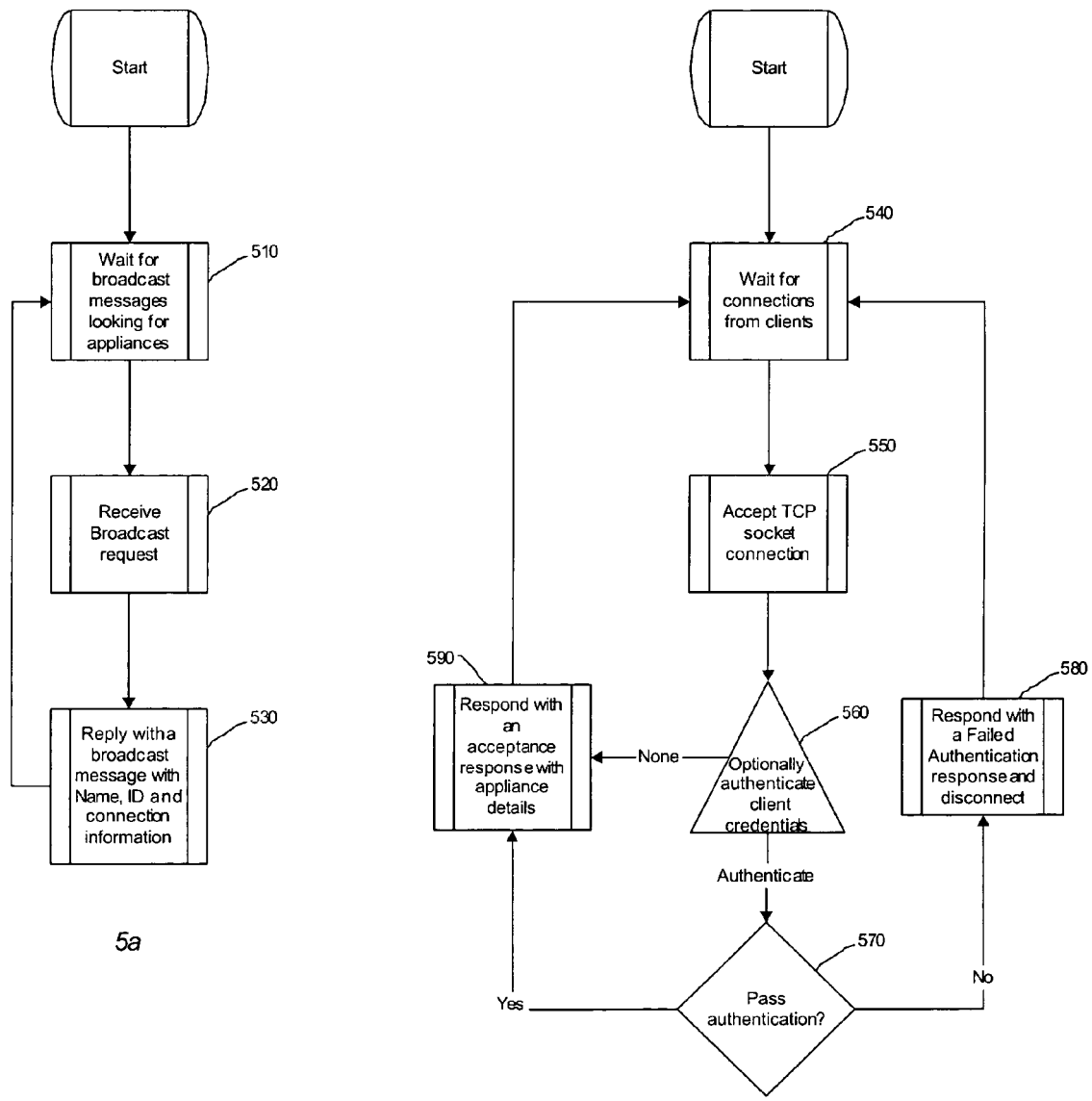
FIG. 5a illustrates one embodiment of a methodology for the appliance side of the appliance waiting for broadcast discovery procedure in accordance with the present system and method.
FIG. 5b illustrates one embodiment of a methodology for the appliance side of the appliance waiting for connection discovery procedure in accordance with the present system and method.

Illustrated in FIG. 4 is one embodiment of a methodology 400 associated with the appliance discovery process from the client side (e.g., cellular phone) of the system. Upon commencing the discovery process and as previously described, the system has prompted the user for appliance information at 310. The system has also sent a broadcast discovery message seeking a network appliance at 320. It will be understood that these discovery processes are suitably automatic or manual processes. As well, the processes are suitably programmed or pre-programmed by a user.

With continued reference to FIG. 4, upon sending a broadcast message seeking a network appliance 420, the system pauses for a user selected period of time for a response from the appliance at step 430. In the event that a response is received from an appliance as determined at step 435, the system proceeds by displaying a list of available appliances to the user at step 440. The system then progresses to step 450, where a transmission control protocol (TCP) connection to the appliance is established. However, when no response is received from the appliance at step 435, the system progresses to step 445, wherein the broadcast is terminated and an error signal is transmitted back to the user. It will be appreciated by those skilled in the art that the error signal is suitably comprised of an appliance not found signal, an appliance off signal, or the like.

Whether the user is prompted for appliance information 410 or the user receives the appliance information as a result of a broadcast request 440, the system establishes an operable TCP connection to the selected appliance 450.

Subsequently, the client transmits a connection request with optional credentials for authentication purposes at step 460. It will be understood by those of ordinary skill in the art that any security authentication procedure is suitably used. As well, the system is suitably configured without any necessary authentication parameters.

In the instance that authentication is desired or has been implemented, the system determines at step 470 if the credentials supplied are authentic. In the event that the credentials are not sufficient for authentication, the system returns an error notification to the user at step 480. Alternatively, when the credentials are sufficient for positive authentication, the details of the appliance are transmitted back to the user at step 490.

Illustrated in FIGS. 5a and 5b are embodiments of a methodology associated with the appliance, waiting for broadcast and waiting for connection, respectively, discovery process from the appliance side of the system. Initially, at 510, the appliance side subsystem listens for broadcast discovery messages on the network. These broadcast messages are suitably sent out by clients looking for network connected appliances. Upon receiving a discovery message at step 520, the appliance responds with a series of identification messages at step 530. The contents of the identification messages suitably include an XML document that describes the following:

Name of Appliance
Description
Manufacturer
Model
Serial Numbers
IP Address and Port number for connections for commands and status Other information regarding the appliance is contained in the identification messages transmitted at step 530. One skilled in the art will appreciate the content includes, but is not limited to the above-identified information.

Next, the system is suitably configured to repeat the process by waiting for additional broadcast messages looking for appliances by returning to step 510. Once identifying information is received from the appliance, this information is stored and/or used by the clients to initiate a connection to the appliance.

It will be appreciated that client software packages need not proactively transmit discovery broadcast messages before establishing a connection to an appliance. This step is optional and is suitably used to automatically discover which appliances are available. It will be appreciated that the client software is suitably programmed or pre-programmed with appliance identifying information. If the client software is programmed or pre-programmed with the details of an appliance (e.g., the IP address and port number), the client automatically connects to the appliance without having to transmit any discovery messages. Likewise, client software can prompt the user to program all of the appliance details instead of performing discovery. It will be understood that these optional configurations are suitably appropriate in the event that the client software is behind a firewall or residing on a different network.

FIG. 5b illustrates an alternate embodiment of the series of connection and authentication procedures of the remote client from the appliance side of the system. Initially at step 540, the appliance waits for a connection to be made from a client. Once the client software is ready to initiate a connection to an appliance, the appliance attempts to make a socket connection to the appliance on the advertised IP address and port number of the appliance at step 550.

Upon connection, the client transmits an XML document to the appliance. This document contains information indicating the client's intent to connect to the appliance along with optional authentication credentials at step 560. It will be appreciated that the user is capable of defining if authentication of the client is desired.

In the event that the appliance is programmed or pre-programmed to perform authentication and the supplied credentials 570 fail, then an authentication error message is returned to the client and the connection is terminated at step 580. When no authentication is required at step 560 or when the client's credentials are successfully verified, the appliance transmits, at step 590, an acceptance message containing the same information found in the discovery message as described above. Sending this detail information enables the client application to update any of the appliance information previously retrieved, used or stored. The appliance then returns to listen for requests from a client at step 540.

Figure 6:
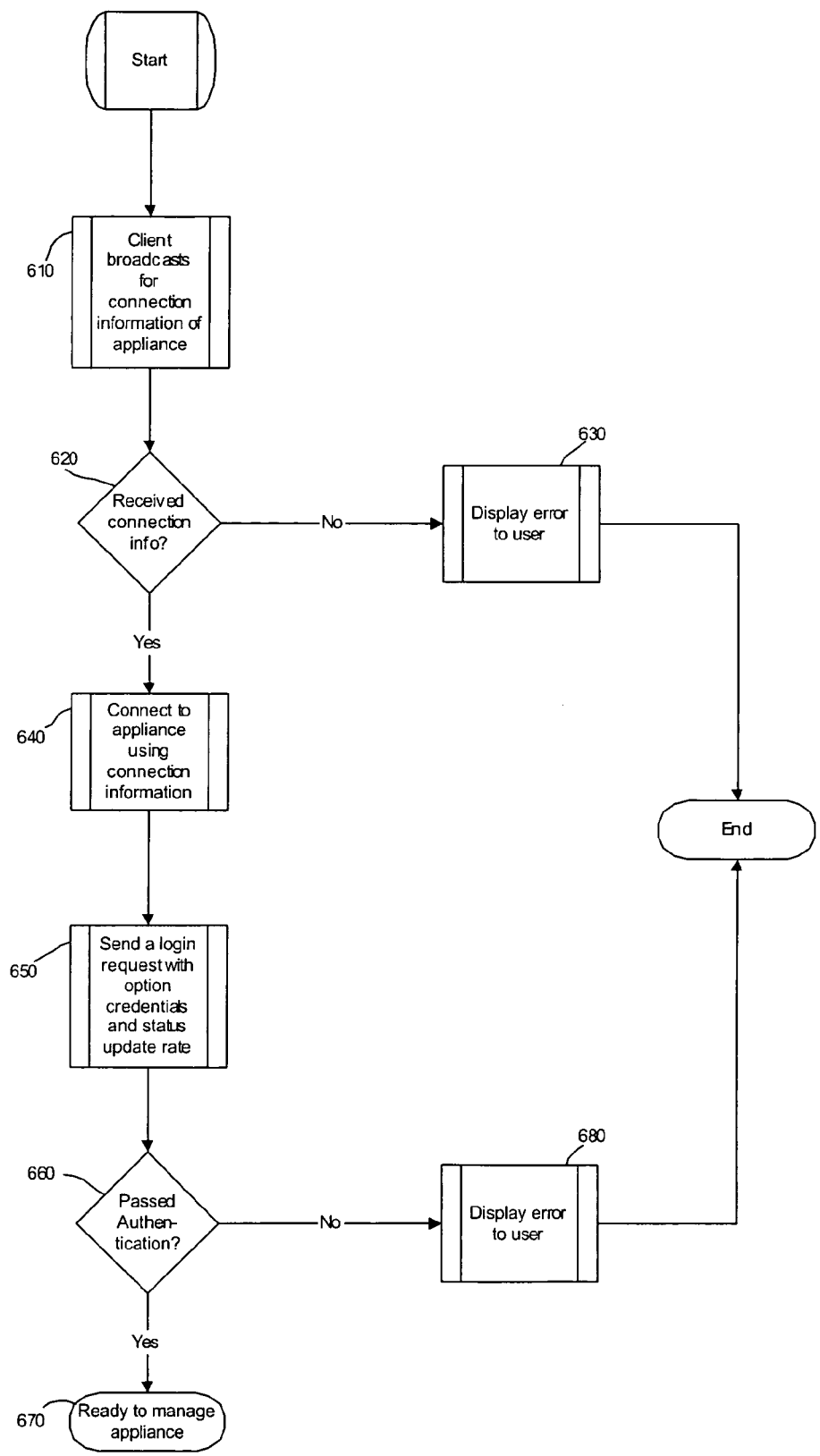
FIG. 6 illustrates one embodiment of a methodology for the remote or client side of the appliance attaching procedure in accordance with the present system and method.

Referring now to FIG. 6, there is illustrated an example of the process of attaching an appliance as viewed from the client side. The process begins at step 610, where the client broadcasts a request for connection information of a particular appliance. The process proceeds to step 620, where a determination is made that no connection information has been received. An error message is displayed to the user at step 630 and the process ends.

In the event that connection information is received at step 620, the client connects to the appliance using the IP address and port information returned at step 640 in response to the connection information request of step 610. The client then transmits a login request with optional authentication credentials to the appliance at step 650. Along with the login request, a status update rate request is transmitted by the client. When the appliance determines at step 660 that the authentication attempt failed, an error is displayed to the user at step 680 and the process terminates. Alternatively, when the authentication information transmitted from the client to the appliance is verified at step 660, the appliance is ready to receive management instructions from the client at step 670.

It will be appreciated that the process for attaching an appliance to a client, as described above, pertains equally to both the client and the appliance. Thus, one skilled in the art will appreciate that the process and instructions transmitted and received are equivalent and need not be rewritten herein.

Figure 7:
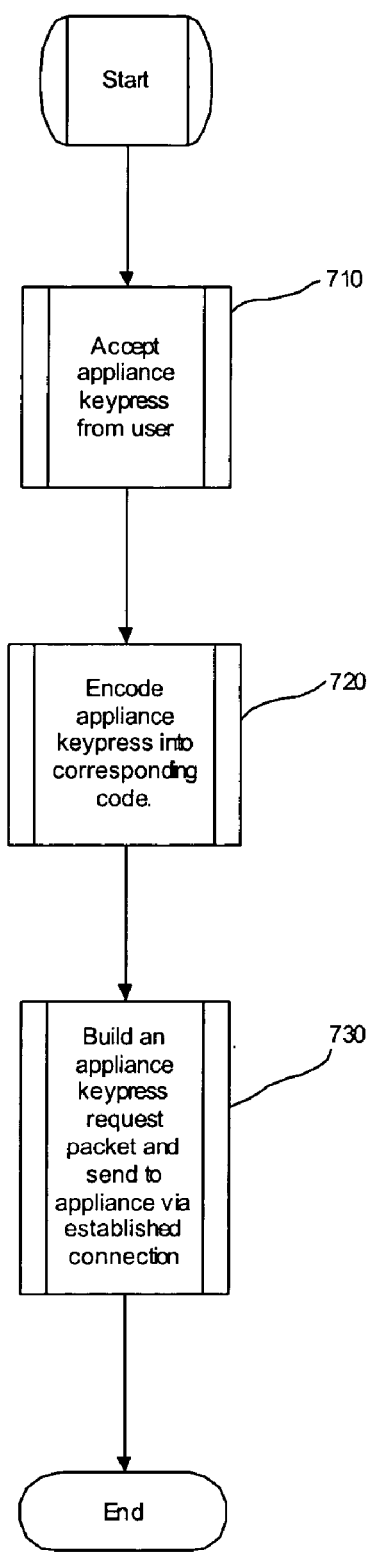
FIG. 7 illustrates one embodiment of a methodology for the remote or client side of the appliance command send procedure in accordance with the present system and method.
Figure 8:
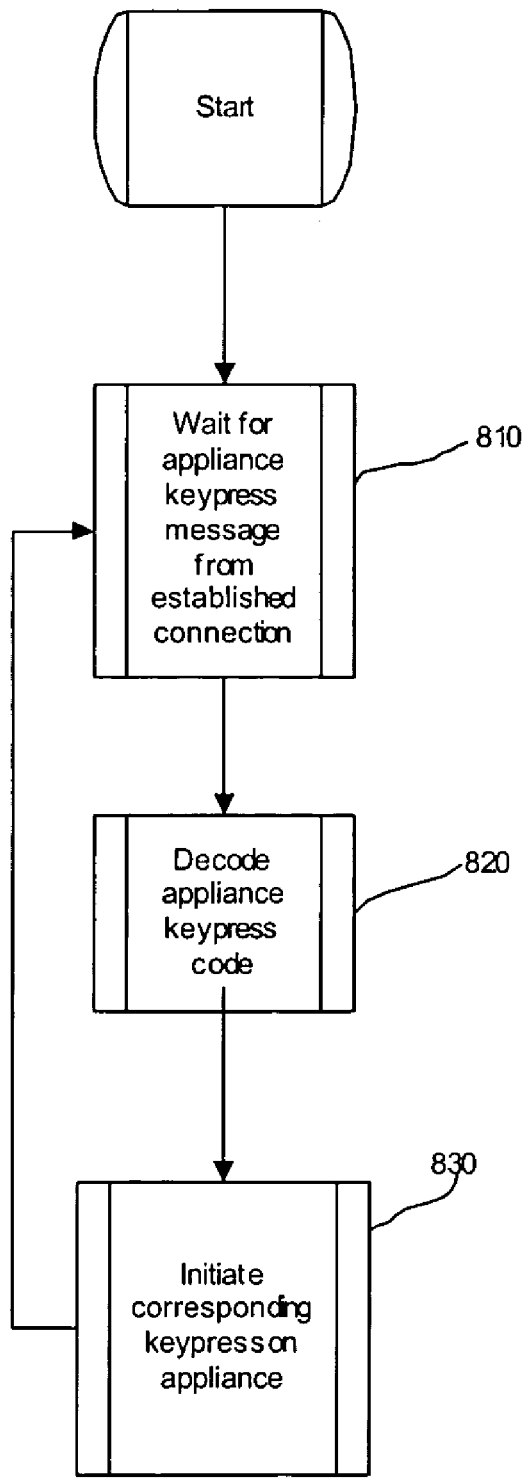
FIG. 8 illustrates one embodiment of a methodology for the appliance side of the appliance command send procedure in accordance with the present system and method.

FIGS. 7 and 8 illustrate the methodology of sending commands and status updates once a client has been successfully attached to an appliance.

Each appliance contains a list of well known commands. For example, often times these include button presses and operations such as set time or set temperature. For an oven, the set of commands consists of an actuation of a physical button on the control panel of the oven such as bake, broil, cool, start, cancel and the like. One skilled in the art will understand that the intelligent appliance is also capable of performing high level operations, such as running a program that will cook a dish to be done at a certain time in addition to running operations by a simple keypress.

It will be appreciated that the client software user interface includes a graphical user interface (GUI) that mimics the appearance of the physical appliance allowing the user to click or press buttons on the desktop. With reference to FIG. 7, upon pointing and clicking on the specific button, the command side of the system accepts a user identified keypress at step 710. Next, the user interface command is encoded and translated into an XML command to be sent to the appliance at step 720. At step 730, the client side of the system builds the keypress request into a packet and transmits the information to the appliance. It will be appreciated by those skilled in the art that the packet is any suitable packet capable of transmission over a computer network, thereby utilizing the communications protocol (e.g., IP, FTP, HTTP, or the like) associated with the type of network over which transmission will occur.

FIG. 8 illustrates the appliance command send methodology from the appliance side. As shown, the appliance waits for a keypress message from the established client connection at step 810. Once received, the appliance side of the system decodes the keypress message contained within the packet at step 820. In accordance with the message sent and subsequent decoding, the appliance initiates the corresponding keypress to effectuate the user command at step 830. As the intelligent appliance is in continuous communication with the remote user, the appliance returns to wait for an appliance keypress from the established connection at step 810.

Figure 9:
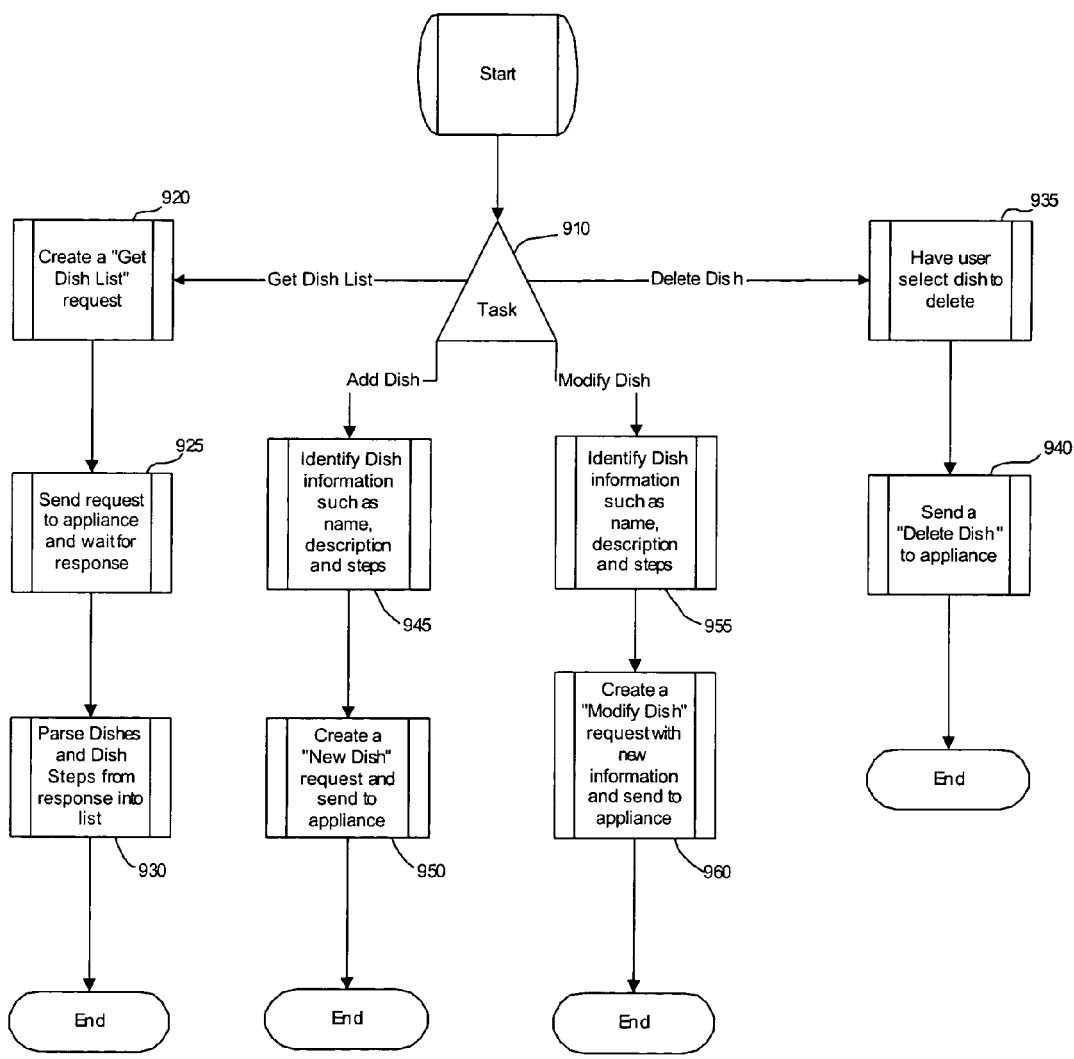
FIG. 9 illustrates one embodiment of a methodology for the remote or client side of the appliance dish management procedure in accordance with the present system and method.
Figure 10:
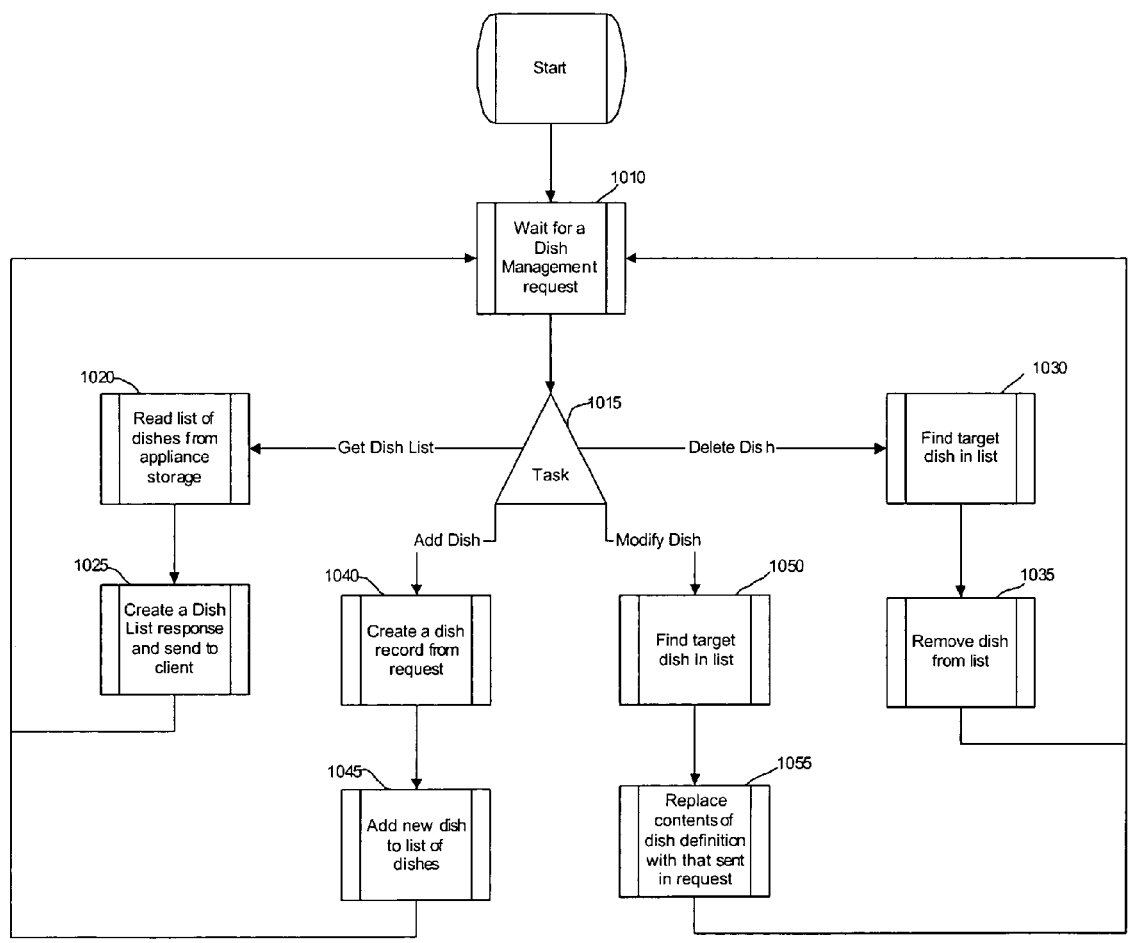
FIG. 10 illustrates one embodiment of a methodology for the appliance side of the appliance dish management procedure in accordance with the present system and method.

FIGS. 9 and 10 illustrate the dish management of the appliance from the client perspective, and the appliance perspective, respectively.

Referring first to FIG. 9, there is depicted the client side of the dish management methodology of the subject invention. The user is presented with four choices regarding the management of dishes by the appliance at 910. The client initiates all the dish operations by sending an XML document with one of four dish commands: retrieving a list of available dishes, deleting a dish, adding a new dish, or modifying an existing dish. First, the user suitably retrieves the list of dishes by transmitting a get dish request at step 920. The client then transmits the request to the appliance at step 925 and waits for the appliance to respond. The response is then parsed and dishes and steps involved in the dishes are generated into a list for the user at step 930.

Returning to 910, the user suitably selects to remove a dish previously created. At step 935, the user identifies a dish from a list of dishes to remove from the available dishes. The client then constructs and transmits a delete dish request to the appliance at step 940. The user desires, at 910, to add a new dish to the stored dishes. The client then identifies dish information at step 945. The dish information includes numerous steps or phases. Steps include refrigeration, bake, convection bake, broil or warm. Ovens are capable of storing the cooking steps for various dishes. A step consists of a method for cooking (bake, convection, etc), a temperature and duration or probe temperature. The collection of steps, along with some descriptive information, constitutes the definition of a dish. For example, the collection of steps suitably comprise a special series of state commands. Thus a "Sabbath" mode is initialized, wherein the special series of commands includes commands for the intelligent appliance 120 to turn-off all lights, maintain a constant temperature, mute all audiblizations, or the like Another example of a special series of state commands includes commands for the intelligent appliance with respect to commercial usage, such as in a restaurant, hotel, bakery or the like. The restaurant owner desires to begin the preparation of a dish before the first employee arrives in the morning. The owner initiates a suitable mode wherein the intelligent appliance preserves a food item in a refrigerated state for a period of time, (i.e., overnight) and heats the dish for completion as the first employee arrives in the morning, readying the dish for sale. Such a restaurant mode enables the owner to halt the intelligent appliance from a remote location in the event that no one will arrive at the time given, or reschedule the finish time to coincide with a late arriving employee.

Returning to FIG. 9, the client then generates a new dish request and transmits the request to the appliance at step 950. The user desires to modify a dish already in the available list of dishes at 910. Accordingly, the client identifies dish information, including steps, name and description at step 955. A modify dish request is then transmitted to the appliance at step 960. Irrespective of the operation identified by the user, the definitions of dishes are stored on appliances and are managed remotely by the client.

Referring now to FIG. 10, there is depicted the appliance side of the dish management methodology of the subject invention. Beginning at step 1010, the appliance is in a state of waiting for management instructions or requests from the client. When a dish management request is received, the appliance determines the task requested at step 1015. Upon the determination that a list of dishes is requested, the appliance will access local or remote storage, and retrieve a list of all dishes available at step 1020. The appliance will then generate an XML document in response to the request, including a listing of all dishes that are defined on the appliance at step 1025. The information for each dish will include items such as name, description, unique dish ID, and a list of cooking steps. The appliance system returns to wait for additional Dish Management requests 1010.

Upon the determination at 1015 that the client has requested to delete a dish, the appliance proceeds to step 1030, where the target dish is located within the list of dishes defined on the appliance. The dish is then deleted, or removed, from the list of definitions on the appliance at step 1035, then returns to a waiting state at step 1010. In order to be certain that the proper dish is deleted, the XML document containing the deletion request also contains an unique dish identification, thereby preventing the unwanted deletion of a dish.

Returning to step 1015, the determination is made that the request from the client is an add dish request. The appliance then generates a dish record at step 1040. The dish record incorporates all the dish definition information needed. The information includes, but need not be limited to numerous steps or phases. Steps include refrigeration, bake, convection bake, broil or warm. Ovens can store the cooking steps for various dishes. A step consists of a method for cooking (bake, convection, etc), a temperature and duration or probe temperature. The collection of steps, along with some descriptive information, constitutes the definition of a dish. The dish information is then stored into the list of available dishes at step 1045. Following the storage of the dish information at step 1045, the system returns to step 1010 to await further dish management requests.

Upon the determination at step 1015 that the request received from the client directs the appliance to modify an existing dish, the appliance locates the target dish in a list of available dishes defined on the appliance at step 1050. Dishes are suitably modified by sending an XML document to the appliance containing the dish modify command, the unique dish ID to be modified, and the new dish definition. The appliance then replaces the contents of the dish information with the new information sent in the XML document containing the dish modify request at step 1055, then returns to step 1010 to wait for further requests from the client. One skilled in the art will appreciate the use of XML documents is exemplary in nature and the management and control of the appliance from a client is suitably accomplished using other suitable languages.

Figure 11A:
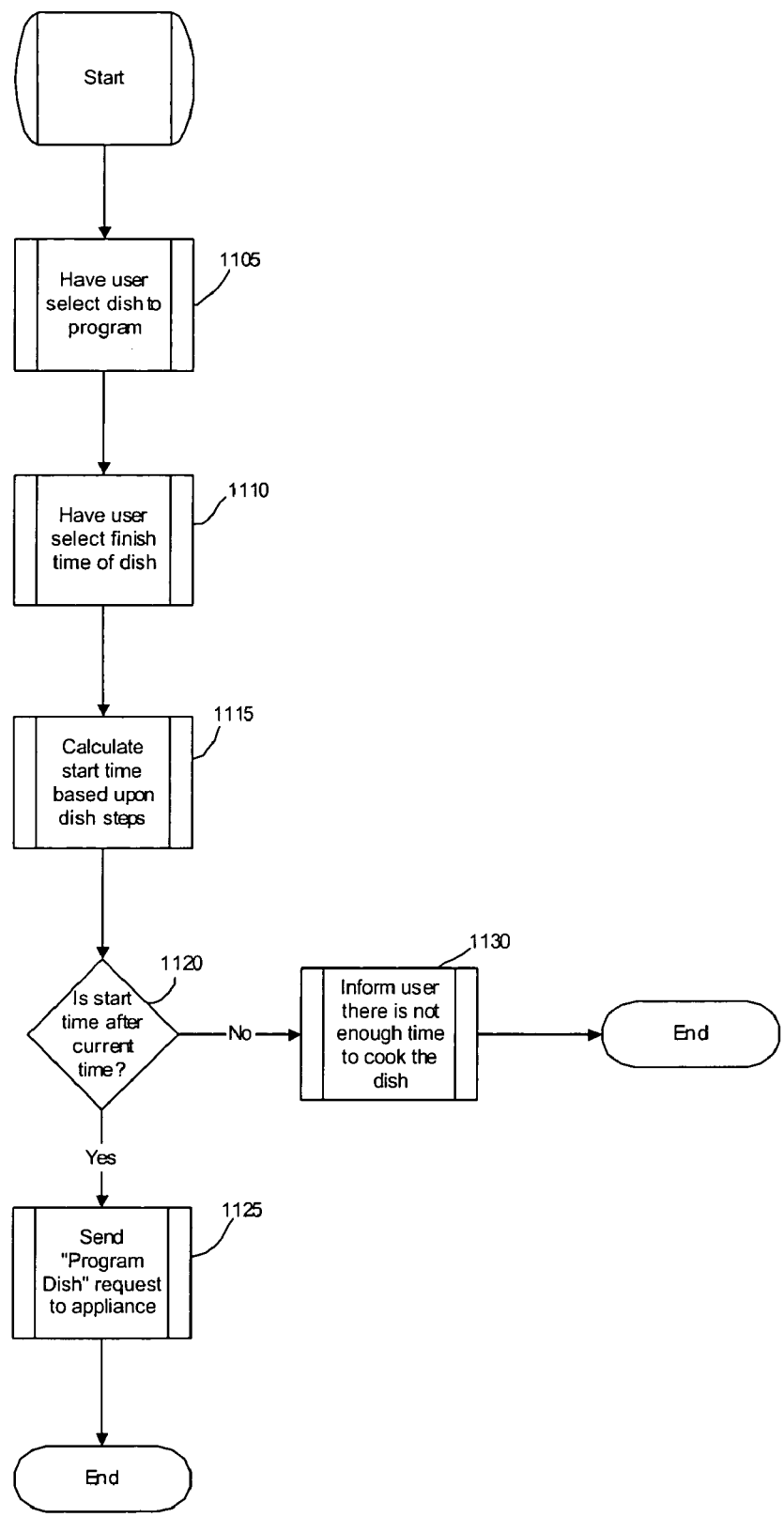
FIG. 11A illustrates one embodiment of a methodology for the remote or client side of the appliance program dish procedure in accordance with the present system and method.

FIGS. 11A through 12B illustrate the methodology of programming a dish for cooking once a client has defined a dish to an appliance. In addition to storing and understanding the definition of dishes, the appliance also is suitably equipped to execute steps for cooking a dish. The intelligent appliance of this embodiment need only ascertain the dish to cook and the time at which the dish should be ready for consumption. The typical steps for cooking a dish are the following:

Start by refrigerating the dish for a period of time
This is followed by the cooking phase (bake, convection bake, broil)
Keep the dish warmed for a period of time
Start refrigeration after the warming phase if the program has not been canceled FIG. 11A illustrates the methodology, as viewed by the client, for programming the appliance. The client awaits the selection by the user of the desired dish at step 1105. It will be apparent that the dish selected will be stored, either on a server accessible to the appliance, the client or the appliance itself. The user must then select, at step 1110, the finish time for the dish, e.g., when the user would like to consume the prepared dish. The client software will then, based upon the programmed steps and the selected finish time, calculate a start time at step 1115. When a determination is made at step 1120 that the start time has already passed, the client will inform the user that there is not enough time to cook the dish at step 1130. When, however, the determination at step 1120 is made that the start time is after the current time, the program dish command is sent to the appliance along with the unique dish ID and the finish time at step 1125.

Figure 11B:
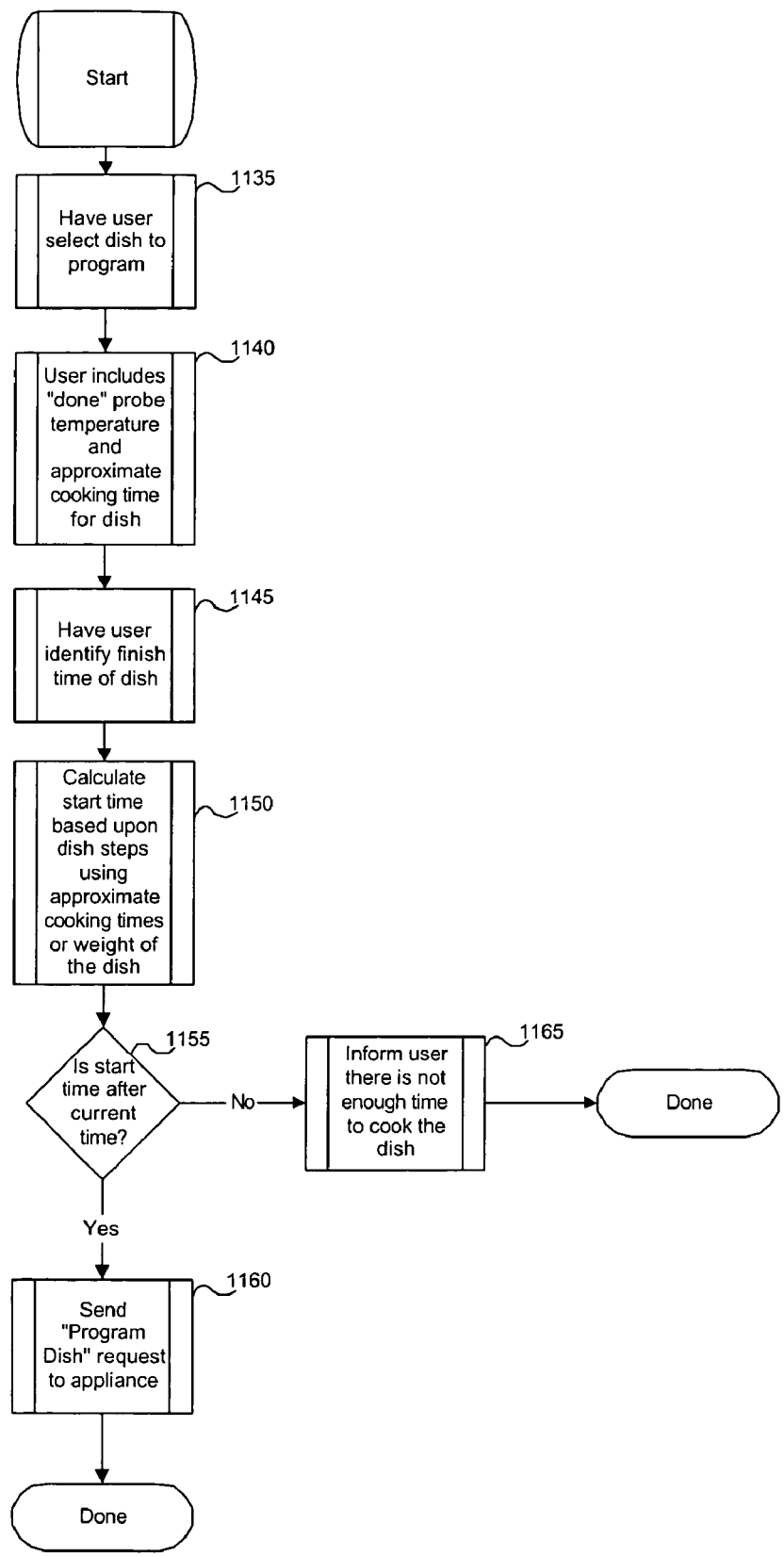
FIG. 11B illustrates an alternate embodiment of a methodology for the remote or client side of the appliance program dish procedure using a probe component in accordance with the present system and method.

FIG. 11B illustrates an alternate methodology, as viewed by the client, for programming the appliance using an appliance probe. It will be appreciated by those skilled in the art that the reference to an appliance probe includes, but need not be limited to a thermometer inserted into a dish, a thermo-sensing device capable of ascertaining the internal temperature of a food, a thermal imaging device with similar capacities, or the like. The use of a temperature probe inserted into a dish is for exemplary purposes only and the skilled artisan will appreciate other techniques and devices are suitably used to ascertain information regarding a dish. The client awaits the selection by the user of the desired dish at step 1135. It will be apparent that the dish selected will be stored, either on a server accessible to the appliance, the client or preferably the appliance itself. The user is then prompted to input the internal temperature at which the dish is to be considered done, e.g., cooked, the approximate amount of time needed to cook the dish and the oven temperature at step 1140. Alternatively, at step 1140, the approximate amount of time needed to cook the dish is suitably calculated by entering the weight of the dish, in addition to the probe temperature and the oven temperature. For example, a user inputs a desired probe temperature of 170 degrees Fahrenheit, a dish weight of five-pounds and an oven temperature of 325 degrees Fahrenheit, then the approximate cooking time of the dish is calculated to be 35–40 minutes. In using a probe, the appliance is suitably equipped to determine the end of the cook cycle based on the internal temperature of the dish itself, particularly meats, and not just a specific time to cook the dish. The user must then identify, at step 1145, the finish time for the dish, e.g., when the user would like to consume the prepared dish.

After inputting the desired internal temperature and the approximate cooking time or food weight and oven temperature, the client software will, based upon the programmed steps and the selected finish time, calculate a start time at step 1150. In the event that a determination is made at step 1155 that the start time has already passed, the client will inform the user that there is not enough time to cook the dish at step 1165. When, however, the determination at step 1155 is made that the start time is after the current time, the program dish command is sent to the appliance along with the unique dish ID and the finish time at step 1160.

Figure 12A:
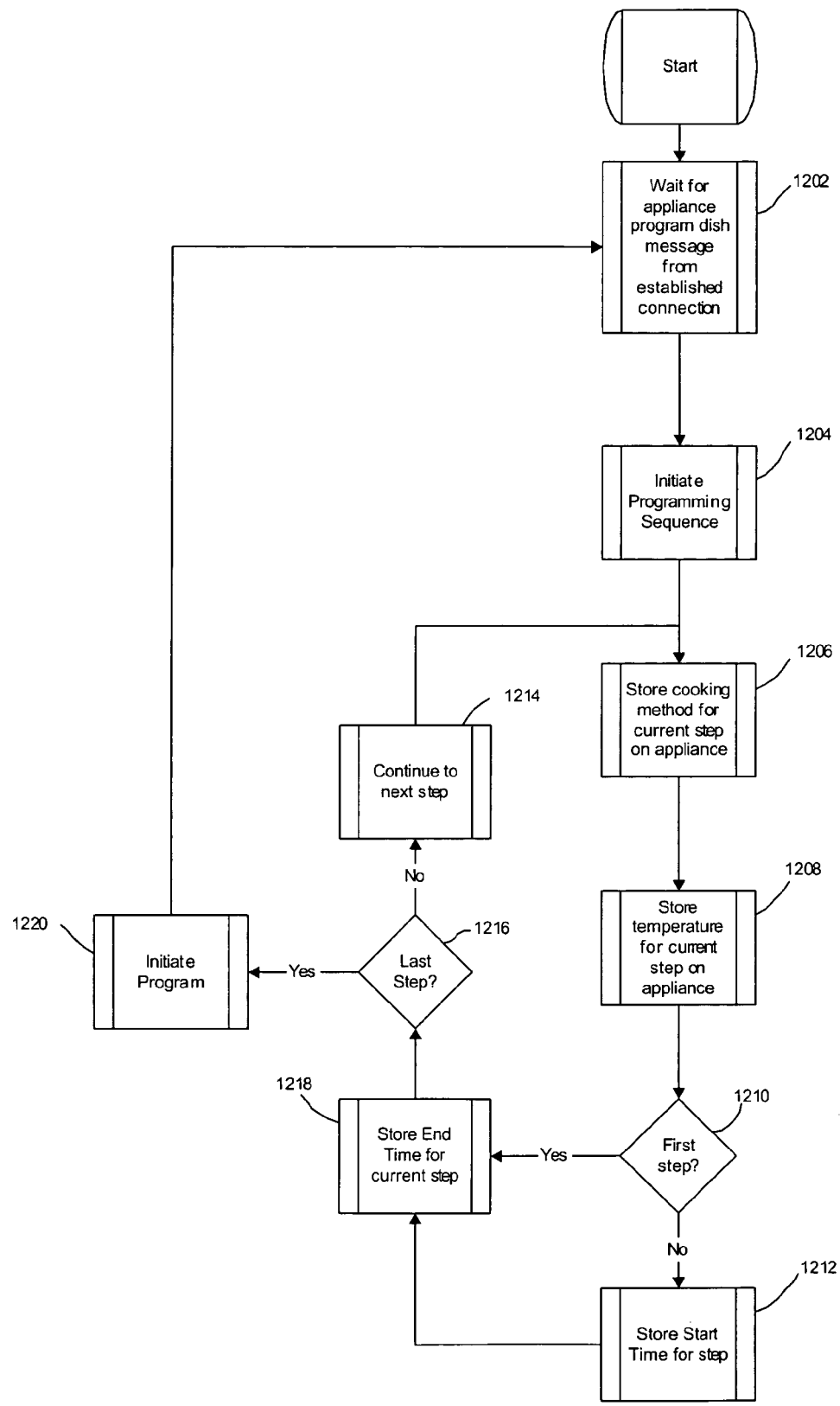
FIG. 12A illustrates one embodiment of a methodology for the appliance side of the appliance program dish procedure in accordance with the present system and method.

Referring now to FIG. 12A, there is shown the methodology of programming a dish for cooking from the appliance side of the system. The appliance waits for an appliance program dish message from the connection previously established between the remote client and the appliance at step 1202. Upon the receipt of a program dish command from the remote client, the appliance initiates the programming of a dish at step 1204. A cooking method for the current cooking step on the appliance is then stored at step 1206. Cooking methods include, but are not limited to, freezing, cooling, baking, broiling, warming, roasting, and the like. The appliance then stores the temperature for the current cooking step at step 1208. Temperature settings, as instructed by the dish, vary from heating at high temperatures to cooling at lower temperatures.

The appliance then determines, at step 1210, that the cooking step currently being stored is not the first cooking step to be programmed. Upon such an occurrence, the appliance then stores the appropriate start time for the current cooking step at step 1212. With the start time for the current cooking step programmed, the end time for the current cooking step is stored at step 1218. Returning to step 1210, a determination that the current cooking step is in fact the first cooking step leads the appliance to step 1218, where the end time for the current cooking step is to be programmed.

Irrespective of whether or not the current cooking step is the first step, or simply another in a series of cooking steps, following step 1218, the appliance must determine if the current cooking step is the last, or final, cooking step in the dish at step 1216. When the current cooking step is determined, at step 1216, to not be the last step, the appliance moves on to program the next step, at 1214, and proceeds to return to step 1206, where the cooking method for the next step is to be programmed.

In the event that the current cooking step is actually the last, or final step in the dish program, the appliance proceeds to initiate the start of the programming at step 1220 and returns the appliance to step 1202. It will be appreciated by those skilled in the art that the communications module of the appliance will relay the specifics of each programmed cooking step to the control module of the appliance mechanism.

Figure 12B:
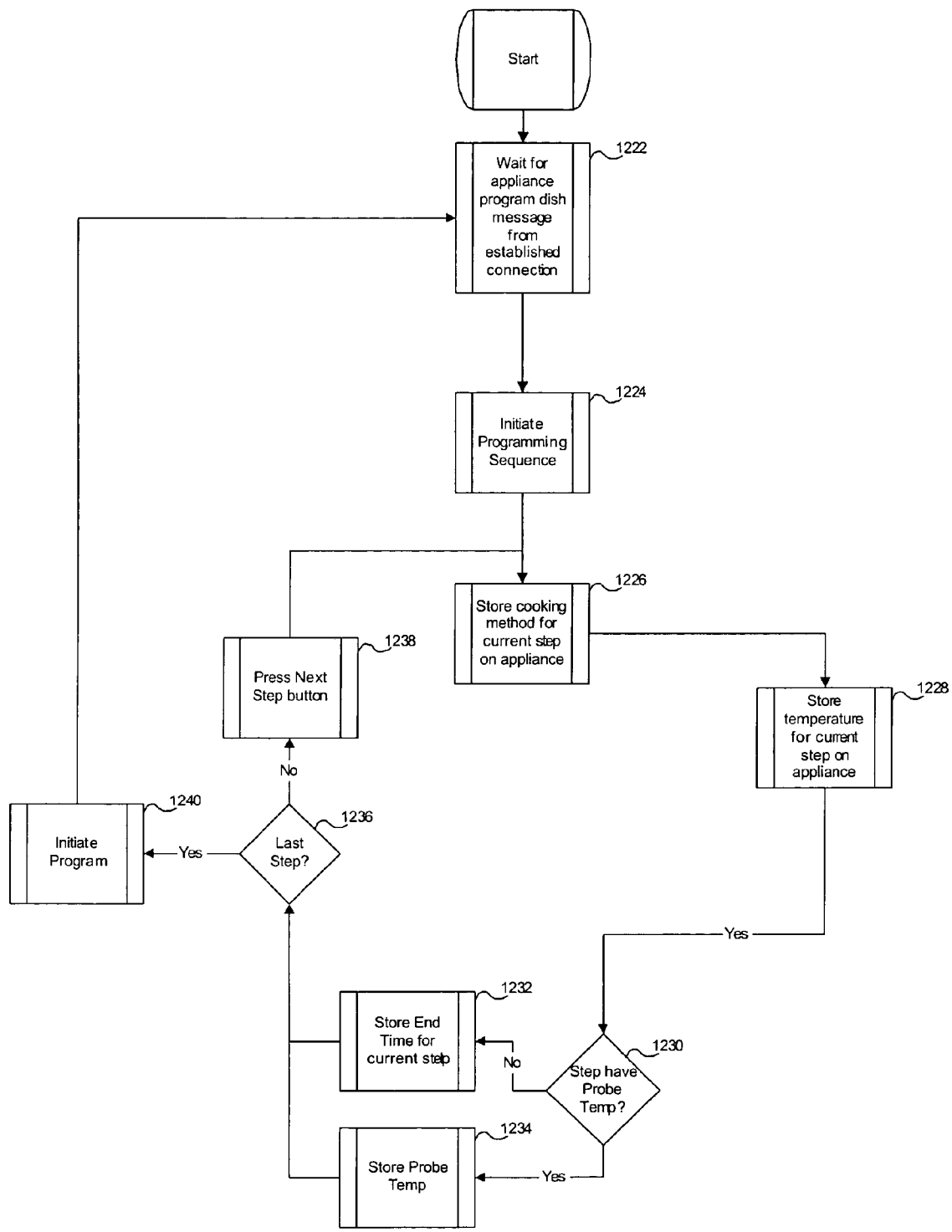
FIG. 12B illustrates an alternate embodiment of a methodology for the appliance side of the appliance program dish procedure using a probe component in accordance with the present system and method.

Referring to FIG. 12B, there is shown an alternate methodology of programming a dish for cooking by the appliance side of the system making use of an appliance probe. The appliance waits for an appliance program dish message from the connection previously established between the remote client and the appliance at step 1222. Upon the receipt of a program dish command from the remote client, the appliance initiates the programming of a dish at step 1224. A cooking method for the current cooking step on the appliance is then stored at step 1226. Cooking methods include, but need not be limited to, freezing, cooling, baking, broiling, warming, roasting, and the like. The appliance then stores the temperature for the current cooking step at step 1228. Temperature settings, as instructed by the dish, vary from heating at high temperatures to cooling at lower temperatures.

The appliance then proceeds to make a determination at step 1230 that the recently stored step does not have a probe temperature, i.e. the step doesn't require the probe to be used to gather the temperature of the dish during the step. Once the determination is made at step 1230 that the probe is not required, the end time for the current step must be stored at step 1232.

Returning to step 1230, the determination is made that a probe temperature is required in the step. A probe temperature, i.e., the internal temperature to which the dish should be cooked, is stored at step 1234 along with the weight of the dish in order to establish the end time for the current step.

Irrespective of whether or not the current cooking step is the first step, or simply another in a series of cooking steps, following either step 1232 or step 1234, the appliance must determine if the current cooking step is the last, or final, cooking step in the dish at step 1236. When the current cooking step is determined, at step 1236, to not be the last step, the appliance moves on to program the next step at 1238, and proceeds to return to step 1226, where the cooking method for the next step is to be stored.

In the event that the current cooking step is actually the last, or final step in the dish program, the appliance proceeds to initiate the start of the program 1240 and returns the appliance to step 1222. It will be appreciated by those skilled in the art that the communications module of the appliance will relay the specifics of each programmed cooking step to the control module of the appliance mechanism.

Figure 13:
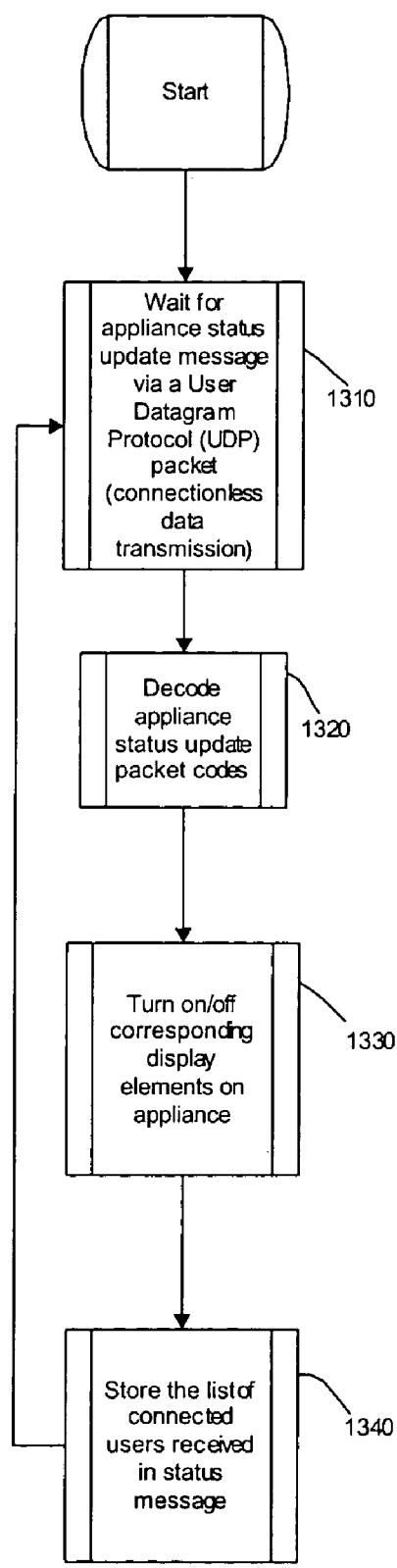
FIG. 13 illustrates one embodiment of a methodology for the remote or client side of the appliance status update procedure in accordance with the present system and method.
Figure 14:
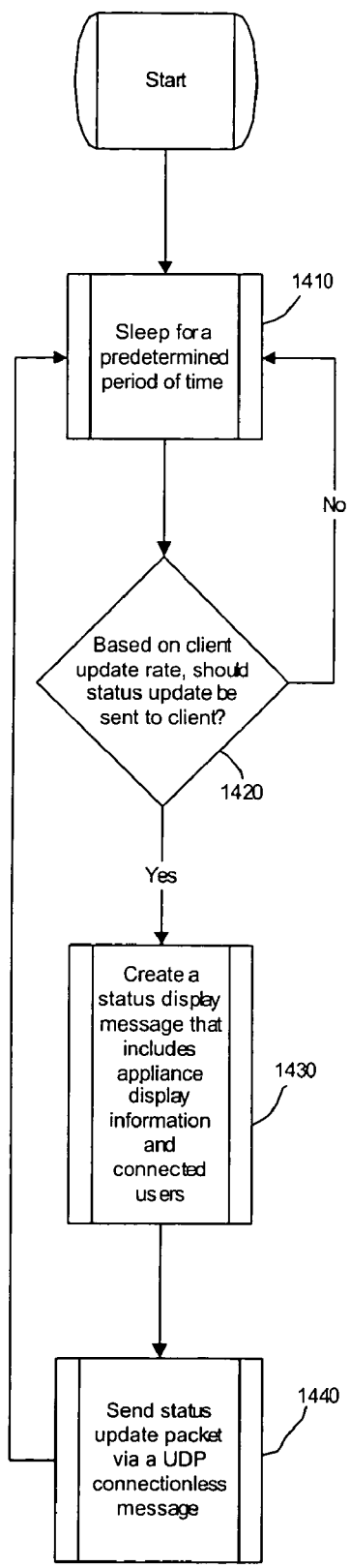
FIG. 14 illustrates one embodiment of a methodology for the appliance side of the appliance status update procedure in accordance with the present system and method.

FIGS. 13 and 14 illustrate the methodology of updating the status of the appliance from both the remote or client side and the appliance side. It will be appreciated that the status messages are suitably sent from the appliance either automatically or at a pace dictated by the client or at the request of the client. For example, desktop software that resides on a computer in a residential or commercial structure desires rapid status updates (e.g., 5–10 times per second) while a PDA user operating over the internet desires updates (e.g., 2–4 times per second). One skilled in the art will appreciate that the refresh rate on status updates for the appliance is discretionary and is suitably changed in accordance with the user's selections. In addition, some users desire to request updates as needed, e.g., wireless data phones or controlling the appliance via telephone, rather than receiving automatic updates. The skilled artisan will appreciate that the transmission rate varies in accordance with the type of appliance, the amount of information and the types of networks over which the data is transmitted to the client. It will also be appreciated that the content of the status message will vary in accordance with the type of appliance. The general format is the same, but the specifics will differ for various appliances. For example, an oven would typically contain the following:

The current oven temperature

The probe temperature of the dish

The clock status (cooking time and/or clock time)

Mode of the oven (cool, bake, broil, etc)

Whether or not the oven is in program mode and what step/phase it is in

Status of various indicators or LED on the oven display

Turning to FIG. 13, there is shown the status update procedure for the appliance from the remote or client side. The client waits, at step 1310, for an appliance status update message transmitted from the appliance. It will be appreciated by one skilled in the art that while this embodiment uses a user datagram protocol, or UDP, packet to contain the status update message, the application of the present invention need not be so limited, as other connectionless or connection oriented data transmission protocol packets are also acceptable.

Upon receipt of the status update message, the client decodes the appliance status update packet codes at step 1320. The client will take the status messages and, at its discretion, relay the information to the user through its user interface. At step 1330, display elements on the appliance are turned on or off, thereby "illuminating" or updating corresponding screen components of the appliance to visually show the user appliance status. The list of connected users received in the status message is subsequently stored at step 1340. It will be appreciated that the display referenced above need not be limited to the visual spectrum, but further include audiblizing the appliance status to the user.

FIG. 14 illustrates the appliance status update on the appliance side. Beginning in a rest state at step 1410, the appliance rests for a predetermined amount of time. For example, for every second, a fraction of a second is spent in sleep mode. In one embodiment, the amount of time spent in sleep mode at step 1410 is a fraction of second as identified by the user. Upon awakening, the appliance determines at step 1420 that based on the client selected update rate, no status update should be sent to the client. The appliance then returns to rest at step 1410.

In the event that at step 1420, it is determined that a status update message should be sent in accordance with the client update rate, the appliance creates a status display message at step 1430. The status display message includes, but need not be limited to display information and connected users. Once the status display message has been generated, the appliance transmits the status update message in a packet to the client at step 1440. For the present embodiment, the communications protocol used to transmit the message is a user datagram protocol packet. However, it will be understood by those skilled in the art that the communications protocol is any suitable connectionless or connection oriented communications protocol and the subject invention need not be limited to the user datagram protocol. Once the status update message has been sent, the appliance returns to resting for the predetermined period of time 1410.

Figure 15:
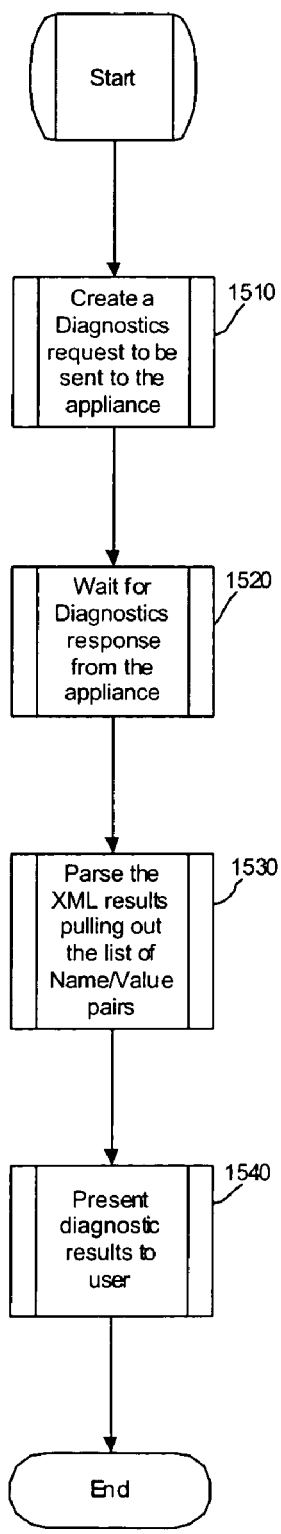
FIG. 15 illustrates one embodiment of a methodology for the remote or client side of the appliance diagnostics procedure in accordance with the present system and method.
Figure 16:
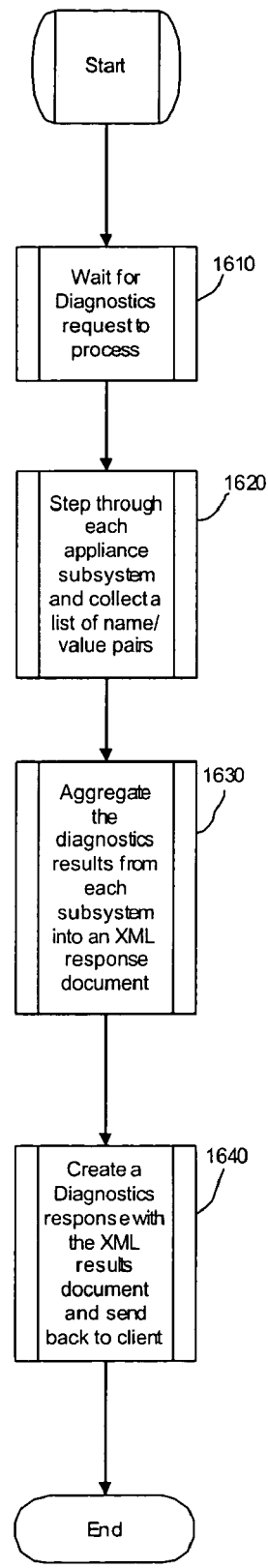
FIG. 16 illustrates one embodiment of a methodology for the appliance side of the appliance diagnostics procedure in accordance with the present system and method.

FIGS. 15 and 16 illustrate embodiments of a methodology for the client side of the appliance diagnostics procedure and a methodology for the appliance side of the appliance diagnostics procedure, respectively. Remote diagnostics are capable of being performed upon the request of a client as a result of the incorporation of remote communication abilities.

Referring first to FIG. 15, there is shown a procedure for initiating the remote diagnostics of an appliance by a remote client. The client generates a diagnostics request to be sent to the client at step 1510. The diagnostic request includes, but is not limited to tests on the refrigeration unit, the heating elements, the power subsystem, the control module, and various safety subsystems in the appliance. The client then waits for a response from the appliance at step 1520. The skilled artisan will appreciate that the period of time for waiting before retransmitting the diagnostics request is suitably predetermined in accordance with the client directives. After receiving an XML document containing the diagnostics information requested, the results are parsed and the Name/Value pairs are pulled out of the list at step 1530. The user is presented with the diagnostic results at step 1540.

Turning now to FIG. 16, there is represented a procedure for processing a diagnostics request received from the client or automatically initiated by the appliance. The appliance waits for a diagnostic request to be processed at step 1610. This waiting allows the appliance to determine the extent or level of depth required by the request and prepare the appliance for carrying out the request. The appliance then, at step 1620, proceeds through each subsystem and collects a list of Name/Value pairs. When diagnostics is requested by the client software via a perform diagnostics command, the appliance will inspect the request for the diagnostics level and then initiate a series of diagnostic tests on its various subsystems. This includes, but need not be limited to, tests on the refrigeration unit, the heating elements, the power subsystem, the control module, and various safety subsystems in the appliance.

The diagnostic results from each subsystem are aggregated into an XML response document at step 1630. The appliance will then generate a diagnostics response using the XML results document and transmit those results to the client at step 1640. This form of remote diagnostics allows service centers to perform initial tests on appliances without having to make a trip to the appliance site. Initial diagnosis can be made and parts ordered/collected before visiting residential or commercial location for repair.

In an alternate embodiment, the appliance initiates the diagnostics request. For example, when safety alarms (e.g., high temperatures, power fluctuations, internal combustion, fire, or the like) trigger or faults in subsystems are identified, the appliance performs various levels of self diagnostics and send a message to the owner or a service center. This message is sent to the client or service center in a variety of different manners, including, but not limited to email, SMS, HTTP, direct socket connections, or the like. Certain alarms are also tied into a local security system so that specific critical alarms generate security alerts to monitoring companies to immediately contact the appliance owner or alert the fire department and/or police.

Figure 17:
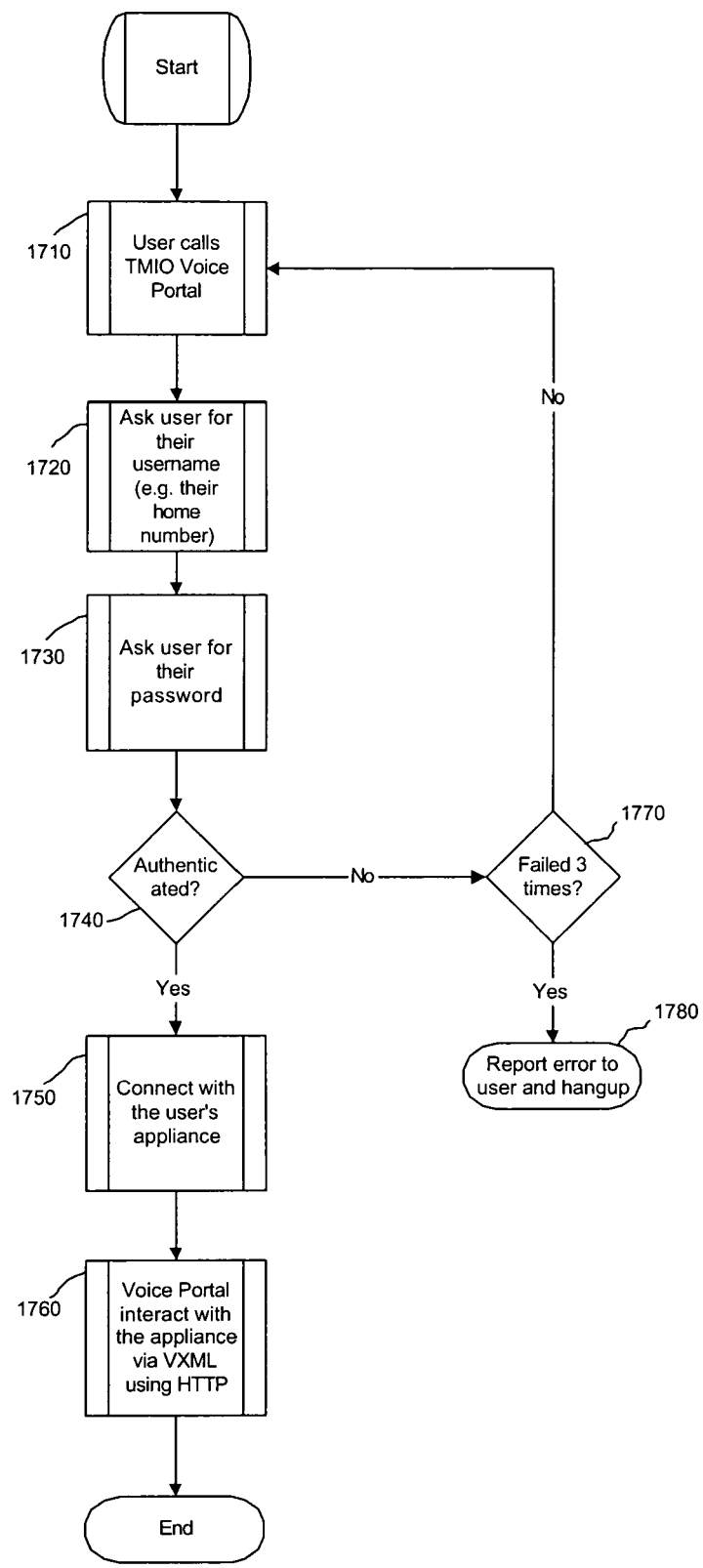
FIG. 17 illustrates one embodiment of a methodology for the appliance voice control procedure in accordance with the present system and method.

FIG. 17 illustrates a methodology for controlling an appliance using voice commands from a remote location. Interactive Voice Recognition (IVR), or voice portals, enable systems to be controlled through voice commands. VXML allows systems to outline and describe call flows that a voice portal or an IVR system would follow for the user. The voice portal plays pre-recorded audio files or employs text-to-speech (TTS) technology to convert standard text to spoken works. Voice portals also allows user to speak selections or responses in addition to the pressing of buttons (also know as Dual Tone Multi-Frequency or DTMF). The speech recognition technology is known as Automated Speech Recognition (ASR).

Referring to FIG. 17, the procedure initiates with a user calling into a voice portal at step 1710. Using one of the above-identified technologies, the voice portal would welcome the user and query the user for a username, e.g., telephone number, at step 1720. This is spoken or entered from the phone keypad. Each key on a touch-tone phone correlates to a different frequency. The frequencies represent numbers or letters, as directed by the receiving device. After retrieving the username, the user is prompted for a password at step 1730. For example, a numeric PIN is suitably used because a PIN is easily entered or spoken on a phone.

A determination is made at step 1740 that the password entered by the user is invalid and the system returns to step 1710 for a second attempt. In the event that the additional two attempts to enter the correct password have failed at step 1770, the error is reported to the user and the call is terminated at step 1780. When a user has correctly entered and authenticated password at step 1740, the details of the appliances are retrieved by the voice portal and are used to connect to the appliance at step 1750. Commands, management and diagnostics are then performed by the voice portal interacting with the appliance through VXML using HTTP for transmission at step 1760. The voice system facilitates the interaction by using DTMF and ASR to retrieve information and requests from the user and pass that along to the appliance. The voice system then takes resulting VXML from the appliance, invokes any necessary TTS and presents the resulting audio to the caller. Thus, a user is provided with the ability to control and manage an appliance with ease from a variety of remote locations.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures are suitably made from such details without departing from the spirit or scope of the applicant's general inventive concept.

We claim:

1. An intelligent appliance control system comprising:
    a data interface adapted to place an associated appliance in data communication with an associated remote user interface;
    means adapted for acquiring state information from the associated appliance, which state information is representative of at least one of a current and future state of the associated appliance;
    means adapted for communicating the state information to the data interface, whereby the state information is made available for communication to the associated remote user interface;
    the data interface including means adapted for acquiring state change information received from the associated remote user interface, representative of at least one altered, desired future state of the associated appliance;
    means adapted for generating a state change signal representative of the desired future state of the associated appliance;
    the means adapted for generating a state change signal include means adapted for selecting an operation to be performed;
means adapted for communicating the state change signal to the associated appliance;
    wherein the operation to be performed is one of the group consisting of retrieving a list of available dishes, creating a new dish, modifying an existing dish, and deleting a stored dish.

2. The intelligent appliance control system of claim 1, wherein the data interface is adapted to communicate with the associated remote user interface via at least one of a selected Internet protocol and a web browser application.

3. The intelligent appliance control system of claim 1, wherein the data interface includes a processor and a memory, the processor selectively operating under a communication control program disposed in the memory to facilitate data communication with the associated remote user interface, and wherein the processor also operates under an appliance control program to facilitate control of the associated appliance in accordance with at least one of the state information and the state change information.

4. The intelligent appliance control system of claim 1, further comprising means adapted for authenticating the associated remote user interface.

5. The intelligent appliance control system of claim 1, wherein the means adapted for acquiring state information from the associated appliance further comprises a probe.

6. The intelligent appliance control system of claim 1, wherein a future state of the associated appliance is a diagnostic state.

7. The intelligent appliance control system of claim 1, wherein the state information communicated to the associated remote user interface is a status update of the associated appliance.

8. The intelligent appliance control system of claim 1, wherein communicating the state change signal to the associated appliance is accomplished using at least one of a wireless communications channel, a power-line communications channel, an Ethernet communications channel, and a Token-ring communications channel.

9. The intelligent appliance control system of claim 1 wherein at least one of the state information received from the associated appliance and the state change information received from the associated remote user interface is in the form of at least one of data associated with a verbal command, data associated with an audible command, data associated with an infrared command, and data associated with a tactile input command.

10. The intelligent appliance control system of claim 1 further comprising data storage means adapted for storing data associated with at least one dish.

11. The intelligent appliance control system of claim 10 wherein the system further comprises:
   user selection means adapted for receiving selection data from an associated user of at least one dish on which an operation is to be performed;
   retrieval means adapted for retrieving data from the data storage means for at least selected one dish; and
   display means for displaying the data associated with the at least one selected dish.

12. The intelligent appliance control system of claim 11 further comprising means adapted for commencing a preselected food operation corresponding the operation to be performed.

13. The intelligent appliance control system of claim 12 wherein the preselected food operation includes at least one of a cooling operation and a cooking operation.

14. The intelligent appliance control system of claim 13 further comprising means adapted for calculating at least one of a cook time, a start time and a cooking temperature corresponding to a cooking operation.

15. The intelligent appliance control system of claim 11 wherein the operation to be performed is modifying an existing dish, and further comprising;
   means adapted for receiving selected data associated with the dish to be modified; and
   means adapted for updating data associated with the dish to be modified in the data storage means.

16. The intelligent appliance control system of claim 11, wherein the operation to be performed is deleting a dish, and further comprising:
   user selection means adapted for receiving selection data from an associated user of at least one dish on which is to be deleted;
   retrieval means adapted for retrieving data from the data storage means for at least selected one dish; and
   deletion means adapted for deleting data associated with the at least one selected dish from the data storage means.

17. The intelligent appliance control system of claim 10, wherein the operation to be performed is creating a new dish, and further comprising:
   means adapted for receiving selected data associated with the new dish from an associated user; and
   means adapted for storing the received data in the data storage means.

18. A method for controlling an intelligent appliance comprising the steps of:
   acquiring state information from an associated appliance, which state information is representative of at least one of a current and future state of the associated appliance;
   communicating the state information to a data interface, which data interface is in communication with an associated remote user interface, whereby the state information is made available for communication to the associated user interface;
   acquiring state change information received from the associated remote user interface, by the data interface, which state change information is representative of at least one altered, desired future state of the associated appliance;
   generating a state change signal representative of the desired future state of the associated appliance, wherein the step of generating a state change signal further comprises the step of selecting an operation to be performed; and
   communicating the state chance signal to the associated appliance;
   wherein the operation to be performed is one of the group consisting of retrieving a list of available dishes, creating a new dish, modifying an existing dish, and deleting a stored dish.

19. The method for controlling an intelligent appliance of claim 18, wherein the data interface is adapted to communicate with the associated remote user interface via at least one of a selected Internet protocol and a web browser application.

20. The method for controlling an intelligent appliance of claim 18, wherein the data interface includes a processor and a memory, the processor selectively operating under a communication control program disposed in the memory to facilitate data communication with the associated remote user interface, and wherein the processor also operates under an appliance control program to facilitate control of the associated appliance in accordance with at least one of the state information and the state change information.

21. The method for controlling an intelligent appliance of claim 18, further comprising the step of authenticating the associated remote user interface.

22. The method for controlling an intelligent appliance of claim 18, wherein acquiring state information from the associated appliance is accomplished using an Internet enabled probe.

23. The method for controlling an intelligent appliance of claim 18, wherein a future state of the associated appliance is a diagnostic state.

24. The method for controlling an intelligent appliance of claim 18, wherein the state information communicated to the associated remote user interface is a status update of the associated appliance.

25. The method for controlling an intelligent appliance of claim 18, wherein communicating the state change signal to the associated appliance is accomplished using at least one of the group consisting of a wireless communications channel, a power-line communications channel, an Ethernet communications channel, and a Token-ring communications channel.

26. The method for controlling an intelligent appliance of claim 18 wherein at least one of the state information received from the associated appliance and the state change information received from the associated remote user interface is in the form of at least one of data associated with a verbal command, data associated with an audible command, data associated with an infrared command, and data associated with a tactile input command.

27. The method for controlling an intelligent appliance of claim 18 further comprising the step of storing data associated with at least one dish in a data storage.

28. The method for controlling an intelligent appliance of claim 27, wherein the method further comprises the steps of:
   receiving selection data from an associated user of at least one dish on which an operation is to be performed;
   retrieving data from the data storage for at least selected one dish; and displaying the data associated with the at least one selected dish.

29. The method for controlling an intelligent appliance of claim 28 further comprising the step of commencing a preselected food operation corresponding the operation to be performed.

30. The method for controlling an intelligent appliance of claim 29 wherein the preselected food operation includes at least one of a cooling operation and a cooking operation.

31. The method for controlling an intelligent appliance of claim 30 further comprising the step of calculating at least one of a cook time, a start time and a cooking temperature corresponding to a cooking operation.

32. The method for controlling an intelligent appliance of claim 28, wherein the operation to be performed is creating a new dish, and further comprising the steps of:
 receiving selected data associated with the new dish from an associated user; and
 storing the received data in the data storage means.

33. The method for controlling an intelligent appliance of claim 28 wherein the operation to be performed is modifying an existing dish, and further comprising the step of;
 receiving selected data associated with the dish to be modified; and
 updating data associated with the dish to be modified in the data storage means.

34. The method for controlling an intelligent appliance of claim 28, wherein the operation to be performed is deleting a dish, and further comprising the steps of:
 receiving selection data from an associated user of at least one dish on which is to be deleted;
 retrieving data from the data storage means for at least selected one dish; and
 deleting data associated with the at least one selected dish from the data storage means.

35. The computer-implemented method for controlling an intelligent appliance comprising the steps of:
 acquiring state information from an associated appliance, which state information is representative of at least one of a current and future state of the associated appliance;
 communicating the state information to a data interface, which data interface is in communication with an associated remote user interface, whereby the state information is made available for communication to the associated user interface;
 acquiring state change information received from the associated remote user interface, by the data interface, which state change information is representative of an altered, desired future state of the associated appliance;
 generating a state change signal representative of the desired future state of the associated appliance, wherein the step of generating a state change signal further comprises the step of selecting an operation to be performed; and
 communicating the state change signal to the associated appliance; wherein the operation to be performed is one of the group consisting of retrieving a list of available dishes, creating a new dish, modifying an existing dish, and deleting a stored dish.

36. The computer-implemented method for controlling an intelligent appliance of claim 35, wherein the data interface is adapted to communicate with the associated remote user interface via at least one of a selected Internet protocol and web browser application.

37. The computer-implemented method for controlling an intelligent appliance of claim 35, wherein the data interface includes a processor and a memory, the processor selectively operating under a communication control program disposed in the memory to facilitate data communication with the associated remote user interface, and wherein the processor also operates under an appliance control program to facilitate control of the associated appliance in accordance with at least one of the state information and the state change information.

38. The computer-implemented method for controlling an intelligent appliance of claim 35, wherein acquiring state information from the associated appliance is accomplished using a probe.

39. The computer-implemented method for controlling an intelligent appliance of claim 35, wherein communicating the state change signal to the associated appliance is accomplished using at least one of the group consisting of a wireless communications channel, a power-line communications channel, an Ethernet communications channel, and a Token-ring communications channel.

40. The computer implemented method for controlling an intelligent appliance of claim 35 wherein at least one of the state information received from the associated appliance and the state change information received from the associated remote user interface is in the form of at least one of data associated with a verbal command, data associated with an audible command, data associated with an infrared command, and data associated with a tactile input command.

41. The computer-readable medium of instructions having computer-readabel instructions stored thereon for controlling an intelligent appliance comprising:
 a data interface adapted to place an associated appliance in data communication with an associated remote user interface;
 means adapted for acquiring state information from the associated appliance, which state information is representative of at least one of a current and future state of the associated appliance;
 means adapted for communicating the state information to the data interface, whereby the state information is made available for communication to the associated user interface;
 the data interface including means for acquiring state change information received from the associated remote user interface, representative of an altered, desired future state of the associated appliance;
 means adapted for generating a state change signal representative of the desired future state of the associated appliance;
 the means adapted for generating a state change signal include means adapted for selecting an operation to be performed; and
 means adapted for communicating the state change signal to the associated appliance;
 wherein the operation to be performed is one of the group consisting of retrieving a list of available dishes, creating a new dish, modifying an existing dish, and deleting a stored dish.

42. The computer-readable medium of claim 41, wherein the data interface is adapted to communicate with the associated remote user interface via at least one of a selected Internet protocol and a web browser application.

43. The computer-readable medium of claim 41, wherein the data interface includes a processor and a memory, the processor selectively operating under a communication control program disposed in the memory to facilitate data communication with the associated remote user interface, and wherein the processor also operates under an appliance control program to facilitate control of the associated appliance in accordance with at least one of the state information and the state change information.

44. The computer-readable medium of claim 41, wherein communicating the state change signal to the associated appliance is accomplished using at least one of the group consisting of a wireless communications channel, a power-line communications channel, an Ethernet communications channel, and a Token-ring communications channel.

45. The computer-readable medium of claim 41 wherein at least one of the state information received from the associated appliance and the state change information received from the associated remote user interface is in the form of at least one of data associated with a verbal command, data associated with an audible command, data associated with an infrared command, and data associated with a tactile input command.

46. The computer-readable medium of claim 41, wherein the means adapted for acquiring state information from the associated appliance further comprises a probe.

* * * * *